United States Patent
Andaloro et al.

(10) Patent No.: US 12,262,711 B2
(45) Date of Patent: *Apr. 1, 2025

(54) INSECTICIDAL MIXTURES OF BIFENTHRIN AND CHLORANTRANILIPROLE

(71) Applicants: FMC CORPORATION, Philadelphia, PA (US); FMC AGRO SINGAPORE PTE. LTD., Singapore (SG)

(72) Inventors: John T. Andaloro, Hockessin, DE (US); Seth David Delaney, Franklin, NC (US); Hector Eduardo Portillo, Newark, DE (US); Luis Teixeira, Haddonfield, NJ (US); Guozhi Wang, Oakland Gardens, NY (US)

(73) Assignees: FMC CORPORATION, Philadelphia, PA (US); FMC AGRO SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,243

(22) Filed: Dec. 19, 2022

(65) Prior Publication Data

US 2023/0225322 A1  Jul. 20, 2023

Related U.S. Application Data

(62) Division of application No. 17/071,061, filed on Oct. 15, 2020, now Pat. No. 11,559,057.

(60) Provisional application No. 62/923,152, filed on Oct. 18, 2019.

(51) Int. Cl.
*A01N 43/56* (2006.01)
*A01N 25/04* (2006.01)
*A01N 31/04* (2006.01)

(52) U.S. Cl.
CPC ............. *A01N 43/56* (2013.01); *A01N 25/04* (2013.01); *A01N 31/04* (2013.01)

(58) Field of Classification Search
None
See application file for complete search history.

(56) References Cited

FOREIGN PATENT DOCUMENTS

| CN | 103907634 A | ‡ | 7/2014 | |
|---|---|---|---|---|
| CN | 106342875 A | ‡ | 1/2017 | ............. A01N 25/12 |
| CN | 107668063 A | ‡ | 2/2018 | ............. A01N 43/56 |

OTHER PUBLICATIONS

Protocol: USA-19-557, Title: VKM32—Control of western bean cutworm in field corn, Feb. 5, 2019.‡
Protocol: USA-19-559, Title: VKM32—Control of bollworm and impact on yield in cotton, Feb. 5, 2019.‡
Protocol: USA-19-555, Title: VKM32—Control of soybean looper in soybean, Feb. 5, 2019.‡
Protocol: USA-19-554, Title: VKM32—Controlf of stink bugs in soybean, Feb. 5, 2019.‡

‡ imported from a related application

*Primary Examiner* — Alton N Pryor
(74) *Attorney, Agent, or Firm* — FMC CORPORATION

(57) ABSTRACT

Improved concentrate, premix and tank mix compositions comprising bifenthrin and chlorantraniliprole are provided.

15 Claims, No Drawings

INSECTICIDAL MIXTURES OF BIFENTHRIN AND CHLORANTRANILIPROLE

CROSS-REFERENCE TO RELATED APPLICATIONS

This application claims the benefit of U.S. Provisional Application No. 62/923,152 filed Oct. 18, 2019.

FIELD OF THE DISCLOSURE

The present disclosure relates to the field of insecticides. In particular, the disclosure relates to insecticidal compositions comprising bifenthrin and chlorantraniliprole that exhibit unexpected activity.

BACKGROUND

To enable the efficient elimination or controlling of unwanted insects in agricultural and other applications, it is desirable to use effective chemical insecticides on these unwanted pests. Formulations containing multiple insecticides are desirable in order to broaden the spectrum of agronomically important insect and other pest species killed or controlled and take advantage of the individual pesticidal characteristics of each of the active ingredients.

Compositions containing mixtures two or more insecticides have been practiced in the art, but problems such the physical stability of such mixtures when diluted with water and unpredictable antagonism can adversely impact the efficacy associated with the insecticide combination. When traditional insecticidal compositions are combined, the combined components (surfactants, viscosity modifiers, wetting agents) of both may cause accelerated physical degradation (phase separation) of the mixture when diluted in low to moderately hard water. This physical degradation can occur in the mix tanks prior to application on plants or another locus where control is desired. Often this problem goes unnoticed and a uniform application of the insecticide mixture is not achieved, yielding inadequate efficacy.

A need therefore exists for improved insecticidal mixtures comprising the combination of bifenthrin and chlorantraniliprole.

BRIEF DESCRIPTION

In some aspects of the disclosure, insecticidal concentrate compositions are provided. The compositions comprise bifenthrin and chlorantraniliprole, wherein (i) the weight ratio of bifenthrin to chlorantraniliprole on an active ingredient basis is from about 10:1 to about 1:10; (ii) the bifenthrin concentration is from about 10 wt. % to about 60 wt. %; and (iii) the composition is a liquid, a dispersion, a suspension, or an emulsion.

In some other aspects of the disclosure, a tank mix or premix composition is provided. The tank mix or premix comprises the insecticidal concentrate composition described above, wherein each of the bifenthrin and the chlorantraniliprole concentration is less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %.

In some other aspects of the disclosure, an insecticidal tank mix or premix composition is provided. The composition comprises: (i) bifenthrin; (ii) chlorantraniliprole; and (iii) a diluent component comprising an aromatic hydrocarbon solvent. The weight ratio of bifenthrin to chlorantraniliprole on an active ingredient basis is from about 10:1 to about 1:10.

In some other aspects of the disclosure, an insecticidal composition is provided. The composition comprises: (i) bifenthrin and chlorantraniliprole, wherein the weight ratio of bifenthrin to chlorantraniliprole on an active ingredient basis is from about 10:1 to about 1:10; and (ii) a phosphate ester of Formula I $$R^1-O-\overset{\overset{O}{\|}}{P}\overset{O-R^2}{\underset{O-R^3}{}}$$

I wherein $R^1$ is a straight-chain or branched alkyl having from 4 to 12 carbon atoms, or a phenyl group optionally substituted with from 1 to 3 $C_1$-$C_4$ straight-chain or branched alkyl groups, and $R^2$ and $R^3$ are each independently a straight-chain or branched alkyl having from 2 to 8 carbon atoms, or a phenyl group optionally substituted with from 1 to 3 $C_1$-$C_4$ straight-chain or branched alkyl groups.

In some other aspects of the disclosure, a method for controlling insect pests on plants is provided. The method comprises applying the any of the above-described tank mix or premix compositions to a plurality of the plants.

DETAILED DESCRIPTION

In some aspects, the present disclosure is generally directed to an insecticidal concentrate composition, the composition comprising bifenthrin and chlorantraniliprole, wherein (i) the weight ratio of bifenthrin to chlorantraniliprole on an active ingredient basis is from about 1.5:1 to about 10:1 or from about 1.5:1 to about 1:10; (ii) the bifenthrin concentration is from about 10 wt. % to about 60 wt. %; and (iii) the composition is a liquid, a dispersion, a suspension, or an emulsion. The insecticidal concentrate compositions may be combined with one or more diluent compounds to form a premix or a tank mix composition.

In some aspects, the present disclosure is further directed to an insecticidal tank mix or premix composition comprising: (i) bifenthrin; (ii) chlorantraniliprole; and (iii) a diluent component comprising at least one diluent compound, wherein the weight ratio of bifenthrin to chlorantraniliprole on an active ingredient basis is from about 1.7:1 to about 10:1 or from about 1.7:1 to about 1:10.

In some aspects, the present disclosure is further directed to an insecticidal composition comprising: (i) bifenthrin and chlorantraniliprole, wherein the weight ratio of bifenthrin to chlorantraniliprole on an active ingredient basis is from about 10:1 to about 1:10; and (ii) a phosphate ester compound.

In some aspects, the compositions of the present disclosure may further comprise one or more adjuvants as defined elsewhere herein.

The present disclosure is further directed to methods of controlling plant pests by applying a biologically effective amount of compositions of the present disclosure or diluted compositions of the present disclosure to a plurality of plants in order to control the pests.

Based on experimental results to date, it is believed that the compositions of the present disclosure are broad-spectrum and provide for enhanced activity against selected Lepidopteran pests (knockdown and faster adulticide), stink bugs, plant bugs, aphids, and mites than other similar premix products.

Further based on experimental results to date, it is believed that premix compositions of the present disclosure provide for improved stink bug control as compared to premixes and tank mixes prepared from the commercial suspension concentrate formulation Besiege® (available from Syngenta) containing 4.63 wt. % Lambda-cyhalothrin and 9.26 wt. % chlorantraniliprole.

Further based on experimental results to date, it is believed that premix compositions of the present disclosure provide for improved residual pest control and more complete control on all pest life stages.

Further based on experimental results to date, it is believed that premix compositions of the present disclosure provide for improved pest control as compared to tank mixes of bifenthrin and chlorantraniliprole formulated at the same ratio.

Yet further based on experimental results to date, it is believed that the combination bifenthrin and chlorantraniliprole effectively impacts the survival of the egg, immature, and adult pest at stages greater than that of either of the single products used alone. An advantage of controlling many life stages of the pest is the resulting more complete control of a pest population over a single pest's life cycle versus the solo offering of either product. The benefits are significant since resistance management is optimized by maximizing control of the pest generation, subsequent pest generations are reduced since fewer individuals survive to produce the next generation, and potentially prolonging the longevity of both products. Growers may also experience reduced pest pressure through the season that will allow them to rotate with a greater number of effective products that are more limited in controlling multiple life stages.

Still further based on experimental results to date, it is believed that the bifenthrin to chlorantraniliprole ratios of the present disclosure maximizes the use rate of those two insecticides, making it an improved insect resistance management choice in a premix. Moreover, based on experimental results to date, synergism between bifenthrin and chlorantraniliprole has been found.

Further based on experimental results to date, the compositions of the present disclosure provide for broader spectrum mite suppression without flaring mites.

Based on experimental results to date, it is believed that premix compositions of the present disclosure provide for improved rainfastedness (such as compared to premixes and tank mixes prepared from the commercial suspension concentrate formulation Coragen® (available from DuPont™) containing 18.4 wt. % chlorantraniliprole). Further based on experimental results to date, the compositions of the present disclosure are rainfast within two hours of application.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claims. The term "consisting essentially of" occupies a middle ground between "comprising" and "consisting of".

Where applicants have defined an embodiment or a portion thereof with an open-ended term such as "comprising," it should be readily understood that (unless otherwise stated) the description should be interpreted to also describe such an embodiment using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

It also is understood that any numerical range recited herein includes all values from the lower value to the upper value. For example, if a weight ratio range is stated as 1:50, it is intended that values such as 2:40, 10:30, or 1:3, etc., are expressly enumerated in this specification. These are only examples of what is specifically intended, and all possible combinations of numerical values between and including the lowest value and the highest value enumerated are to be considered to be expressly stated in this application. It is further understood that if a range is recited in the "from/to" or in the "from about/to about" format, such as from 10:1 to 1:10, the range includes the endpoints (i.e., 10:1 and 1:10).

As used herein, the term "biologically effective amount" refers to the amount of the combination of bifenthrin and chlorantraniliprole sufficient to produce the desired biological effect when applied to (i.e. contacted with) an invertebrate pest to be controlled or its environment, or to a plant, the seed from which the plant is grown, or the locus of the plant (e.g., growth medium) to protect the plant from injury by the invertebrate pest.

As referred to in this disclosure, the term "invertebrate pest" includes arthropods, gastropods, nematodes and helminths of economic importance as pests. The term "arthropod" includes insects, mites, spiders, scorpions, centipedes, millipedes, pill bugs and symphylans. The term "gastropod" includes snails, slugs and other Stylommatophora. The term "nematode" includes members of the phylum Nematoda, such as phytophagous nematodes and helminth nematodes parasitizing animals. The term "helminth" includes all of the parasitic worms, such as roundworms (phylum Nematoda), heartworms (phylum Nematoda, class Secernentea), flukes (phylum Platyhelminthes, class Tematoda), acanthocephalans (phylum Acanthocephala), and tapeworms (phylum Platyhelminthes, class Cestoda).

As used herein, "tank mix" refers to a composition prepared by mixing bifenthrin and chlorantraniliprole in commercially available forms with at least one adjuvant, such as disclosed elsewhere herein, and optionally a quantity of water in a tank by a user immediately before application. Tank mix products require mixing in a spray tank prior to spraying.

As used herein, "premix" refers to a composition that has been pre-prepared by diluting a commercially available form of bifenthrin and chlorantraniliprole with at least one adjuvant, such as disclosed elsewhere herein, and optionally a quantity of water. Premixes have been specially formulated to be sprayed, no mixing required. In one aspect, a pre-mix may be sold in one package.

Spray dilution as disclosed herein is defined as a composition comprising bifenthrin and chlorantraniliprole diluted in water or another carrier suitable for spraying, such as but not limited to petroleum and vegetable derived oils As used herein, the terms "control" and "controlling" refer to killing insect pests or inhibiting insect pest development (including mortality, feeding reduction, and/or mating disruption) of such pests that have infested a plurality of plants. "Control" and "controlling" may also refer to preventing an infestation of insect pests in a plurality of plants.

The term "agronomic" refers to the production of field crops such as for food and fiber and includes without limitation the growth of maize or corn, soybeans and other legumes, rice, cereal (e.g., wheat, oats, barley, rye and rice), leafy vegetables (e.g., lettuce, cabbage, and other cole crops), fruiting vegetables (e.g., tomatoes, pepper, eggplant, crucifers and cucurbits), potatoes, sweet potatoes, grapes, cotton, tree fruits (e.g., pome, stone and citrus), small fruit (e.g., berries and cherries) and other specialty crops (e.g., canola, sunflower and olives).

The term "nonagronomic" refers to other than field crops, such as horticultural crops (e.g., greenhouse, nursery or ornamental plants not grown in a field), residential, agricultural, commercial and industrial structures, turf (e.g., sod farm, pasture, golf course, lawn, sports field, etc.), wood products, stored product, agro-forestry and vegetation management, public health (i.e. human) and animal health (e.g., domesticated animals such as pets, livestock and poultry, undomesticated animals such as wildlife) applications.

The terms "combinations thereof" and "mixtures thereof" as used herein refer to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, the term "aromatic hydrocarbon" refers to optionally substituted unsaturated cyclic compounds consisting of hydrogen and carbon atoms.

The terms "oil dispersible" and "oil dispersion" (OD) formulations refer to a formulation comprising bifenthrin and chlorantraniliprole dispersed in oil.

The term "suspoemulsion" (SE) refers to a formulation comprising bifenthrin and chlorantraniliprole insecticides (water-insoluble compounds) where one of the insecticides is in suspension form and the other of the insecticides is in emulsion form.

The term "suspension concentrate" (SC) refers to a composition containing bifenthrin and chlorantraniliprole suspended in a liquid carrier.

The term "adjuvant" refers to materials that are added to insecticidal compositions of the present disclosure enhance the efficacy of active ingredients and/or improve the overall performance of the product. Adjuvants include, but are not limited to rheology modifiers (e.g., thickeners), wetting agents, dispersants, emulsifiers, surfactants, defoaming agents, solvents, carriers, diluents, oils, pH modifiers, buffers, efficacy enhancers, biocides, antifreeze, and combinations thereof. Suitable adjuvants and other additives are described for example in *McCutcheon's, Volume 2: Functional Materials* published by MC Publishing Company annually.

Insecticidal Actives

The compositions of the present disclosure comprise bifenthrin and chlorantraniliprole insecticides.

The term "bifenthrin" means 2-methylbiphenyl-3-ylmethyl (Z)-(1RS)-cis (2-chloro-3,3,3-trifluoroprop-1-enyl)-2,2-dimethyl cyclopropanecarboxylate. Bifenthrin is effective against a wide spectrum of pests when ingested, but typically is more active than chlorantraniliprole through direct contact, thus functioning as a low to moderately effective ovicide and adulticide in addition to being a good larvicide.

The term chlorantraniliprole means 5-bromo-N-[4-chloro-2-methyl-6-(methylcarbamoyl)phenyl]-2-(3-chloropyridin-2-yl)pyrazole-3-carboxamide.

Chlorantraniliprole active ingredient formulations that are foliar sprayed typically control Lepidopteran, Coleopteran, and Dipteran immature pest stages through ingestion of treated plant material. However, chlorantraniliprole products also show partial activity on adults and eggs of specific species from these insect orders through direct contact with the spray or treated plant parts.

In any of the various aspects of the disclosure, the weight ratio of bifenthrin to chlorantraniliprole is 10:1, 9:1, 8:1, 7:1, 6:1, 5.1, 4.9:1, 4.8:1, 4.7:1, 4.6:1, 4.5:1, 4.4:1, 4.3:1, 4.2:1, 4.1:1, 4:1, 3.9:1, 3.8:1, 3.7:1, 3.6:1, 3.5:1, 3.4:1, 3.3:1, 3.2:1, 3.1:1, 3:1, 2.9:1, 2.8:1, 2.7:1, 2.6:1, 2.5:1, 2.4:1, 2.3:1, 2.2:1, 2.1:1, 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, 1:3, 1:4, 1:5, 1:6, 1:7, 1:8, 1:9 or 1:10, and any range constructed therefrom, such as from 1.7:1 to 10:1, from 1.3:1 to 1:10, from 1.7:1 to 5:1, from 3:1 to 5:1, or from 3.5:1 to 4.5:1.

In some aspects of the present disclosure where the composition further comprises a phosphate ester adjuvant, the weight ratio of bifenthrin to chlorantraniliprole is 10:1, 9:1, 8:1, 7:1, 6:1, 5.1, 4.9:1, 4.8:1, 4.7:1, 4.6:1, 4.5:1, 4.4:1, 4.3:1, 4.2:1, 4.1:1, 4:1, 3.9:1, 3.8:1, 3.7:1, 3.6:1, 3.5:1, 3.4:1, 3.3:1, 3.2:1, 3.1:1, 3:1, 2.9:1, 2.8:1, 2.7:1, 2.6:1, 2.5:1, 2.4:1, 2.3:1, 2.2:1, 2.1:1, 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, 1:3, 1:4, 1:5, 1:6, 1:7, 1:8, 1:9 or 1:10, and any range constructed therefrom, such as from about 10:1 to about 1.5:1, from about 1.5:1 to about 1:10, from about 1.7:1 to about 10:1, from about 1.3:1 to about 1:10, from about 1.7:1 to about 5:1, from about 3:1 to about 5:1, from about 3.5:1 to about 4.5:1, from about 1:1 to about 3:1, from about 1.2:1 to about 2:1, or from about 1.45:1 to about 1.55:1.

The concentration of bifenthrin in concentrate compositions of the present disclosure is suitably about 10 wt. %, about 11 wt. %, about 12 wt. %, about 13 wt. %, about 14 wt. %, about 14.5 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 27.5 wt. %, about 27.6 wt. %, about 27.7 wt. %, about 27.8 wt. %, about 27.9 wt. %, about 28 wt. %, about 28.1 wt. %, about 28.2 wt. %, about 28.3 wt. %, about 28.4 wt. %, about 28.5 wt. %, about 29 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 50 wt. %, or about 60 wt. %, and any range constructed therefrom, such as from about 10 wt. % to about 60 wt. %, from about 10 wt. % to about 50 wt. %, from about 20 wt. % to about 40 wt. %, from about 20 wt. % to about 35 wt. %, from about 25 wt. % to about 31 wt. %, from about 11 wt. % to about 20 wt. %, or from about 12 wt. % to about 17 wt. %.

The concentration of chlorantraniliprole in concentrate compositions of the present disclosure is suitably about 2 wt. %, about 3 wt. %, about 4 wt. %, about 5 wt. %, about 6 wt. %, 6.1 wt. %, 6.2 wt. %, 6.3 wt. %, 6.4 wt. %, 6.5 wt. %, 6.6 wt. %, 6.7 wt. %, 6.8 wt. %, 6.9 wt. %, about 7 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, about 8 wt. %, about 8.5 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, or about 20 wt. %, and any range constructed therefrom, such as from about 2 wt. % to about 20 wt. %, from about 2 wt. % to about 13 wt. %, from about 5 wt. % to about 15 wt. %, from about 5 wt. % to about 10 wt. %, from about 5 wt. % to about 9 wt. %, from about 5 wt. % to about 10 wt. %, or from about 7 wt. % to about 12 wt. %.

The concentration of each of bifenthrin and chlorantraniliprole in tank mix and premix compositions of the present disclosure is suitably less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %.

Surfactants

The compositions of the present disclosure may comprise one or more surfactants. Surfactants generally modify, most often reduce, the surface tension of the liquid. Depending on the nature of the hydrophilic and lipophilic groups in a surfactant molecule, surfactants can be useful as wetting agents, dispersants, emulsifiers and/or defoaming agents. Surfactants within the scope of the present disclosure include nonionic surfactants, anionic surfactants, cationic surfactants, zwitterionic (amphoteric) surfactants, and combinations thereof.

In some aspects, the compositions of the present disclosure may comprise one or more nonionic surfactants. Non-limiting examples of nonionic surfactants include alkoxylates, fatty alcohol alkoxylates, siloxanes/silicones, alkylphenol alkoxylates, fatty acid alkoxylates, alkoxylated amines, alkoxylated fatty acid amides, terminally blocked alkoxylates, fatty acid esters of polyhydroxy compounds, fatty acid esters of glycerol, fatty acid esters of sorbitol, fatty acid esters of sucrose, alkylpolyglucosides, amine oxide, and combinations thereof. Alkoxy groups may suitably be ethoxy, propoxy, or a combination of ethoxy and propoxy groups in random or block configuration.

Non-limiting examples of nonionic surfactants include: alcohol alkoxylates (such as alcohol alkoxylates based on natural and synthetic alcohols (which may be branched or linear) and prepared from the alcohols and ethylene oxide, propylene oxide, butylene oxide or mixtures thereof); amine ethoxylates, alkanolamides and ethoxylated alkanolamides; alkoxylated triglycerides (such as ethoxylated soybean, castor and rapeseed oils); alkylphenol alkoxylates (e.g., octyl- (such as the Triton® X series), nonyl- (such as the Tergitol® HP series), dinonyl-, or dodecyl-)); ethoxylated fatty acids; ethoxylated fatty esters and oils (such as Break Thru® SP 133); ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers (such as block polymers prepared from ethylene oxide or propylene oxide and reverse block polymers where the terminal blocks are prepared from propylene oxide; ethoxylated fatty acids), alkyd PEG (polyethylene glycol) resins, alkyd type copolyesters, graft or comb polymers, and star polymers; polyethylene glycols (PEG); polyethylene glycol fatty acid esters; silicone-based surfactants; sugar-derivatives such as sucrose esters, alkyl polyglycosides and alkyl polysaccharides; and combinations thereof.

Non-limiting examples of sorbitan fatty acid esters include: sorbitan monolaurates (e.g., Span™ 20), sorbitan monopalmitates (e.g., Span™ 40), sorbitan monostearates (e.g., Span™ 60), sorbitan tristearates (e.g., Span™ 65), sorbitan monooleates (e.g., Span™ 80), sorbitan trioleates (e.g., Span™ 85), and combinations thereof. Non-limiting examples of polyethoxylated sorbitan fatty acid esters include Tween® 20, Tween® 21, Tween® 40, Tween® 60, Tween® 80, and Surfonic® L24-4. Non-limiting examples of alkylpyrrolidones include Surfadone™ LP-100 (N-otcyl-2-pyrrolidinone) and Surfadone™ LP-300 (N-dodecyl-2-pyrrolidinone). Non-limiting examples of sorbitol ethoxylate esters that may be suitable for the biopesticides described herein include polyoxyethylene sorbitol oleates (e.g., Arlatone® TV), polyoxyethylene sorbitol hexaoleates (e.g., Cirrasol® G-1086), polyoxyethylene sorbitol hexaoleates (e.g., Cirrasol® G-1096), polyoxyethylene oleate-laurates (e.g., Atlox 1045AR®), and combinations thereof.

Non-limiting examples of organosilicone surfactants: polyether siloxanes (e.g., Break Thru® OE441); polyether trisiloxanes (e.g., Break Thru® S240, Break Thru® S233); polyoxyethylene dimethylsiloxanes (e.g., Dyne-Amic (a mixture with methylated seed oil)); polyoxyethylene methylpolysiloxanes (e.g., KF-640 manufactured by Shin-Etsu Chemical Co., Ltd.); polyalkylene oxide-modified polymethylsiloxane (e.g., Kinetic manufactured by Helena Chemical); polyoxyethylene propylheptamethyltrisiloxanes (e.g., Masil® SF19); polyether-modified polysiloxanes (e.g., Quark (a mixture with an alkyl phenol ethoxylate)); hydroxypropyl heptamethyltrisiloxanes (e.g., Silflow® (a mixture with ethoxylated acetate, polyethylene glycol monoallyl ether acetate and polyethylene glycol diacetate); polyalkylene oxide-modified heptamethyltrisiloxanes (e.g., Silwet® L77); polyether/polymethylsiloxane copolymers (e.g., Syl-Coat®); polyoxyethylene-modified polydimethylsiloxanes (e.g., Xiameter®); polyoxyalkylene oxypropylheptamethyltrisiloxanes; siloxane/polyalkylene oxide copolymers (e.g., Vestis™ (a mixture with polyalkylene oxide)). Other examples include polyether trisiloxane such as, for instance, Break Thru® S240 (a mixture of a polyether trisiloxane and an alcohol ethoxylate (CAS 9043-30-5)), Break Thru® S321, Break Thru® S200, Break Thru® S279, Break Thru® S301, Break Thru® OE 441, Break Thru® S278, Break Thru® S243, Break Thru® S233, Break Thru®

SD260, Silwet® L-77, Silwet® 408, Silwet® HS 429, Silwet® HS 312, Silwet® Y-12808, Silwet® L-7607, Silwet® L-7602, Silwet® L-7210, Silwet® L-7002, Silwet® L-720, and Silwet® L-7200, Sylgard® 309, and Silibase® 2848, and combinations thereof.

Non-limiting examples of nonionic alkoxylate surfactants include alkylphenol alkoxylates, seed oil alkoxylates (e.g., Ecosurf® SA-4, Ecosurf® SA-7, Ecosurf® SA-9, and Ecosurf® SA-15), alkylamine alkoxylates, tallow amine alkoxylates, fatty acid alkoxylates, and combinations thereof. In some aspects, the alkoxylates may be end capped.

Alcohol alkoxylates generally comprise a hydrophobic alkyl chain attached by an ether linkage to a hydrophilic alkoxy chain and have the general formula R—$(OC_{2-4})_n$—OH. R may be $C_6$-$C_{18}$ straight or branched chain alkyl. The alkoxy moiety ($OC_{2-4}$) may be ethoxy, n-propoxy, i-propoxy or the different butoxy isomers. In some aspects, the alkoxy moiety may be a block co-polymer of a polymeric ethoxy and polymeric propoxy or polymeric butoxy, and n may suitably be an integer of from 2 to 100. Suitable alcohol alkoxylates include linear alcohol alkoxylates, branched alcohol alkoxylates, secondary alcohol alkoxylates, and mixtures thereof. Non-limiting examples of alcohol alkoxylates include: Plurafac® SL-42 ($C_{6-10}$—$(PO)_3(EO)_6$); Plurafac® SL-62 ($C_{6-10}$—$(PO)_3(EO)_8$); Lutensol® XL series of the general structure $C_{10}$—$(PO)_a(EO)_b$ where a is 1.0 to 1.5 and b is 4 to 14, including without limitation Lutensol® XL-40, Lutensol® XL-50, Lutensol® XL-60, Lutensol® XL-70, Lutensol® XL-79, Lutensol® XL-80, Lutensol® XL-89, Lutensol® XL-90, Lutensol® XL-99, Lutensol® XL-100, and Lutensol® XL-140; Ecosurf® EH series of the general structure 2-ethyl hexyl $(PO)_m(EO)_n$ including Ecosurf® EH-3, Ecosurf® EH-6, and Ecosurf® EH-9; Ecosurf® SA series including Ecosurf® SA-4 ($C_{6-12}$—$(PO)_{3-4}(EO)_4$), Ecosurf® SA-7 ($C_{6-12}$—$(PO)_{3-4}(EO)_7$, and Ecosurf® SA-9 ($C_{6-12}$—$(PO)_{3-4}(EO)_9$); Tergitol® 15-S-3, Tergitol® 15-S-5, Tergitol® 15-S-7, Tergitol® 15-S-9, Tergitol® 15-S-12, Tergitol® 15-5-15, Tergitol® 15-S-20, Tergitol® 15-S-30, and Tergitol® 15-S-40; Tergitol® L-61, Tergitol® L-62, Tergitol® L-64, Tergitol® L-81, and Tergitol® L-101; Tergitol® TMN-3, Tergitol® TMN-6, and Tergitol® TMN-10), and combinations thereof.

In some aspects, the nonionic surfactant component may comprise at least one polymeric surfactant. Polymeric surfactants fall into several categories including, but not limited to, block copolymers, random copolymers, graft copolymer and star polymers. Non-limiting examples of polymer monomeric units include ethylene oxide, propylene oxide, acrylic, styrene, methacrylic, hydroxystearate, and ester (e.g., alkyd). Examples include, without limitation, EO/PO block copolymers, acrylic/styrene copolymers, methacrylic copolymers, poly hydroxystearate derivatives, alkyd PEG resin derivatives, and combinations thereof. Non-limiting examples of random copolymers include Atlox® 4914 (an alkyd-PEG random copolymer) and Hypermer® A70 and Hypermer® A394 (polyoxyalkylene modified random polyesters). Non-limiting examples of block copolymers include Atlox® 4912 (a block copolymer having an A-B-A configuration based on 12 poly-hydroxysteric acid and PEG), poloxamers (triblock copolymers composed of a central hydrophobic chain of polyoxypropylene flanked by two hydrophilic chains of polyoxyethylene), Atlas™ G-5000 and Atlas™ G-5002L (butyl block copolymers), and Hypermer® B246 and Hypermer® B261 (polyoxyalkylene modified block copolymer). A non-limiting example of a graft copolymer is Atlox® 4913 (a methyl methacrylate graft copolymer backbone having PEG extending therefrom). A non-limiting example of a star shaped polymer is Atlox® 4916 (a sorbitol base reacted with EO and then further reacted with a polymerized fatty acid).

In some aspects, the compositions of the present disclosure may comprise one or more anionic surfactants. Non-limiting examples of anionic surfactants include: alkylaryl sulfonic acids and their salts; carboxylated alcohols; alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; sulfosuccinates and their derivatives such as dialkyl sulfosuccinate salts; and combinations thereof. Non-limiting examples of cationic counterions of the anionic surfactants in salt form may include, but are not limited to, alkali metal, alkaline-earth metal, ammonium, or ($C_1$-$C_6$) alkyl ammonium cation.

Non-limiting examples of anionic surfactants within the scope of the present disclosure include ammonium lauryl sulfate; magnesium lauryl sulfate; sodium 2-ethyl-hexyl sulfate; sodium actyl sulfate; sodium oleyl sulfate; sodium tridecyl sulfate; triethanolamine lauryl sulfate; ammonium linear alcohol; ether sulfate ammonium nonylphenol ether sulfate; ammonium monoxynol-4-sulfate sulfo succinamates; tetrasodium N-(1,2-dicarboxyethyl)-N-octadecylsulfo-succinamate; diamyl ester of sodium sulfosuccinic acid; dihexyl ester of sodium sulfosuccinic acid; dioctyl esters of sodium sulfosuccinic acid; dihexyl ester of sodium sulfosuccinic acid; dioctyl esters of sodium sulfosuccinic acid (Stepwet® DOS 70); sodium polycarboxylate (Geropon® TA/72); sodium salt of naphthalene sulfonate condensate (Morwet® D425, D809, D390, and EFW); calcium naphthalene sulfonates (DAXAD® 19LCAD); sodium lignosulfonates and modified sodium lignosulfonates; sodium methyl oleyl taurate (Geropon® T-77); sodium dodecylbenzene sulfonate; N-oleyl N-methyl taurate; 1,4-dioctoxy-1,4-dioxo-butane-2-sulfonic acid; sodium lauryl sulphate; sodium dioctyl sulphosuccinate; polymeric fatty acid derivatives (such as Afcona® 6226, Atlox® LP1 and Decal® FD) where Atlox® LP1 is a poly(hydroxystearic) acid; C10-16, 1-2.5 EO sodium lauryl ether sulfate (Agniqud® SLES-270); C6-10, 3EO, ammonium sulfate (Witcolate® 1247H); C6-10, 3EO, sodium sulfate (Witcolate® 7093); C8-10 sodium sulfate (Witcolate® 7259); C10-12, 5EO, ammonium sulfate (Witcolate® 1276); C12-14, 3EO, ammonium sulfate (Witcolate® LES-60A); C12-14, 3EO, sodium sulfate (Witcolate® LES-60C); C12-15, 10EO, sodium sulfate (Witcolate® 1050); C12-16 sodium sulfate (Witcolate® WAQ); nonylphenol 4EO, sodium sulfate (Witcolate® D-51-51); nonylphenol 10EO, sodium sulfate (Witcolate® D-51-53); calcium dodecylbenzenesulfonate (Rhodacal® 60 BE and 70 B); isopropylammonium dodecylbenzenesulfonate (Atlox® 3300B); sodium diisopropyl naphthalenesulfonate (Morwet® IP) and 60% calcium dodecylbenzenesulfonate in 2-ethylhexanol (Agnique® ABS 60C EH).

In some aspects, the compositions of the present disclosure may comprise one or more cationic surfactants. Non-limiting examples of cationic surfactants include: amides and ethoxylated amides; amines (such as N-alkyl propanediamines, tripropylenetriamines and dipropylenetetramines); ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; amine oxides such as alkyldimethylamine oxides and bis-(2-hydroxyethyl)-alkylamine oxides; and combinations thereof.

In some aspects of the disclosure, the surfactant component may optionally comprise at least one zwitterionic (ampholytic) surfactant. Non-limiting examples of Zwitterionic (amphoteric) surfactants include betaines, N-alkyl glycines, N-alkyl propionic acids, N-alkylaminobutyric acids, N-alkyliminodipropionic acids, N-hydroxyethyl-N-alkylamidopropyl glycines, N-alkyl taurines, N-alkyl sarcosines, 2-alkylaminopropionic acids, alkylaminoacetic acids containing a $C_8$-$C_{18}$ alkyl group, and combinations thereof.

Efficacy Enhancer Component

In some aspects of the disclosure, the compositions may comprise an efficacy enhancer. A non-limiting example of an efficacy enhancer is a phosphate ester compound. Phosphate esters (also be termed phosphoric esters) within the scope of the present disclosure are shown as Formula I below:

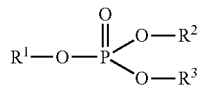

I where $R^1$ is a straight-chain or branched alkyl having 4 to 12 carbon atoms, or phenyl optionally substituted with 1 to 3 $C_1$-$C_4$ straight-chain or branched alkyl groups. $R^2$ and $R^3$ are each independently a straight-chain or branched alkyl having 2 to 8 carbon atoms, or phenyl optionally substituted with 1 to 3 $C_1$-$C_4$ straight-chain or branched alkyl groups.

In some aspects, $R^1$ is: n-butyl; i-butyl; sec-butyl; t-butyl; n-pentyl; n-hexyl; 2-ethyl-hexyl; n-heptyl; n-octyl; i-octyl; n-nonyl; i-nonyl; n-decyl; n-dodecyl; i-dodecyl; phenyl; 3-methyl phenyl; 2,4-dimethyl phenyl; isopropyl phenyl; or t-butyl phenyl.

In some aspects, $R^2$ and $R^3$ are independently: n-butyl; i-butyl; sec-butyl; t-butyl; n-pentyl; n-hexyl; 2-ethyl-hexyl; n-heptyl; n-octyl; i-octyl; phenyl; 3-methylphenyl; 2,4-dimethylphenyl; isopropylphenyl; or t-butylphenyl.

Non-limiting examples of phosphate esters within the scope of the present disclosure include: trixylenyl phosphate, butylatated phenol phosphate, tris(isopropylphenyl) phosphate, cresyl diphenyl phosphate, isopropylphehyl diphenyl phosphate, t-butylphenyl diphenyl phosphate, 2-ethylhexyl, diphenyl phosphate, isodecyl diphenyl phosphate, tri-n-butyl phosphate, tri-n-pentyl phosphate, tri-n-hexyl phosphate, tri-n-heptyl phosphate, tri-n-octyl phosphate, nonyl dioctyl phosphate, butyl dioctyl phosphate, dibutyl nonyl phosphate, butan-2-yl dibutyl phosphate, butan-2-yl diethyl phosphate, butan-2-yl bis(2-methylpropyl) phosphate, 3-methylbutyl dipropan-2-yl phosphate, tris-(2-ethylhexyl)phosphate ("TEHP"), and tri-iso-butyl phosphate ("TIBP"), tributoxyethyl phosphate, and combinations thereof. In some aspects, the phosphate ester is selected from TEHP, tri-n-octyl phosphate, and TIPB. In some particular aspects, the phosphate ester is TEHP.

Phosphate esters within the scope of the present disclosure are considered to be insoluble in water having an aqueous solubility of less than 0.1 g/L, less than 0.05 g/L or less than 0.01 g/L. In some aspects, the phosphate esters may therefore function as an oil phase in the OD, SE and SC compositions of the present disclosure.

The weight ratio of total bifenthrin and chlorantraniliprole to phosphate ester to content in the compositions of the present disclosure is suitably about 0.1:1, about 0.2:1, about 0.3:1, about 0.4:1, about 0.5:1, about 0.75:1, about 1:1, about 1.2:1, about 1.3:1, about 1.4:1, about 1.5:1, about 1.6:1, about 1.7:1, about 1.8:1, about 1.9:1, about 2:1, about 3:1, about 4:1, about 5:1, about 7.5:1, about 10:1, about 12.5:1, about 15:1, about 17.5:1 or about 20:1, and ranges constructed therefrom, such as for instance, from about 0.1:1 to about 20:1, from about 0.4:1 to about 20:1, from about 0.5:1 to about 15:1, from about 0.75:1 to about 10:1, from about 1:1 to about 5:1, or from about 1:1 to about 2:1.

The phosphate ester concentration in the concentrate compositions of the present disclosure may be about 2 wt. %, about 5 wt. %, about 10 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 30 wt. %, about 35 wt. %, about 40 wt. %, about 45 wt. %, or about 50 wt. %, and ranges constructed therefrom, such as from about 2 wt. % to about 50 wt. %, from about 5 wt. % to about 50 wt. %, from about 2 wt. % to about 40 wt. %, from about 5 wt. % to about 35 wt. %, from about 10 wt. % to about 30 wt. %, from about 15 wt. % to about 25 wt. %.

The phosphate ester concentration in premix and tank mix compositions of the present disclosure is suitably about 0.002 wt. % (20 ppm) about 0.005 wt. % (50 ppm), about 0.01 wt. % (100 ppm), about 0.025 wt. % (250 ppm) about 0.05 wt. % (500 ppm), about 0.1 wt. % (1000 ppm), about 0.5 wt. % (5000 ppm), about 1 wt. %, or about 2 wt. %, and ranges constructed therefrom, such as from about 0.002 wt. % to about 2 wt. %, from about 0.01 wt. % to about 2 wt. %, or from about 0.1 wt. % to about 1 wt. %.

Carrier Component and Solvent Component

The concentrate, premix and tank mix compositions of the present disclosure may comprise an agriculturally acceptable carrier (diluent) component comprising at least one carrier compound.

The concentrate, premix and tank mix compositions of the present disclosure may also comprise an agriculturally acceptable solvent component comprising at least one organic solvent compound.

Non-limiting examples of carriers (diluents) and solvents include water and organic solvents that are low-volatile or non-volatile. Non-limiting examples of carriers (diluents) include water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethylphosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2 heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters alkyl and aryl benzoates, γ-butyrolactone, and alcohols, which can be linear, branched, saturated or unsaturated, such as methanol, ethanol, n-propanol, propanol, n-butanol, i-butanol, n-hexanol, 2-ethylhexanol, n-octanol, decanol, i-decyl alcohol, i-octadecanol, cetyl alcohol, lauryl alcohol, tridecyl alcohol, oleyl alcohol, cyclohexanol, tetrahydrofurfuryl alcohol, diacetone alcohol, cresol, benzyl alcohol, and combinations thereof. Diluents also include glycerol esters of saturated and unsaturated fatty acids (typically $C_6$-$C_{22}$), such as plant seed and fruit oils e.g., oils of olive, castor, linseed, sesame, corn (maize), peanut, sunflower, grapeseed, safflower, cottonseed, soybean, rapeseed (canola) (e.g., Codacide® Oil containing rapeseed oil and emulsifiers), coconut and palm kernel oils, animal-sourced fats (e.g., beef tallow, pork tallow, lard, cod liver oil, fish oil), and combinations thereof. Diluents also include alkylated fatty acids (e.g., methylated, ethylated, butylated) wherein the fatty acids may be obtained by hydrolysis of glycerol esters from plant and animal sources, and can be purified by distillation. In some aspects, the diluent comprise water. In some aspects, the diluent comprise soy methyl ester. In some aspects, the solvent comprises an aromatic hydrocarbon (nonionic). In some such aspects, the aromatic hydrocarbon is characterized by a carbon number in the range of $C_9$-$C_{16}$.

The concentration of the carrier component comprising at least one carrier compound in the concentrate compositions of the present disclosure may be about 5 wt. %, about 10 wt. %, about 15 wt. %, about 20 wt. %, about 21 wt. %, about 22 wt. %, about 23 wt. %, about 24 wt. %, about 24.5 wt. %, about 25 wt. %, about 26 wt. %, about 27 wt. %, about 27.5 wt. %, about 28 wt. %, about 29 wt. %, about 30 wt. %, about 35 wt. %, about 40 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 60 wt. %, about 65 wt. %, or about 70 wt. %, and ranges constructed therefrom, such as from about 5 wt. % to about 70 wt. %, from about 10 wt. % to about 70 wt. %, from about 5 wt. % to about 70 wt. %, from about 30 wt. % to about 60 wt. %, from about 10 wt. % to about 60 wt. %, from about 20 wt. % to about 40 wt. %, from about 15 wt. % to about 45 wt. % from about 15 wt. % to about 40 wt. %, and from about 40 wt. % to about 65 wt. %.

The concentration of the solvent component comprising at least one organic solvent compound in the concentrate compositions of the present disclosure may be about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 20 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 40 wt. %, about 45 wt. %, about 50 wt. %, about 55 wt. %, or about 60 wt. %, and ranges constructed therefrom, such as from about 5 wt. % to about 60 wt. %, from about 5 wt. % to about 50 wt. %, from about 5 wt. % to about 30 wt. %, from about 5 wt. % to about 25 wt. %, from about 5 wt. % to about 20 wt. %, from about 10 wt. % to about 60 wt. %, from about 20 wt. % to about 40 wt. %

Dispersant Component

The concentrate compositions of the present disclosure may comprise a dispersant component comprising one or more dispersant compounds. Dispersants adsorb onto the surface of particles, helping to preserve the state of dispersion of the particles, and improving stability by inhibiting reaggregation. Dispersing agents may be added to facilitate dispersion and suspension during manufacture, and to ensure the particles redisperse into water in a premix or a tank mix. The dispersant may generally be selected from non-ionic dispersants, anionic dispersants, or cationic dispersants.

Non-limiting examples of anionic dispersants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates, and combinations thereof. Some further non-limiting examples of anionic dispersants include sodium dodecylsulfate (Na-DS, SDS), MORWET® D-425 (a sodium salt of alkyl naphthalene sulfonate condensate, available from Akzo Nobel), MORWET® D-500 (a sodium salt of alkyl naphthalene sulfonate condensate with a block copolymer, available from Akzo Nobel), sodium dodecylbenzene sulfonic acid (Na-DBSA) (available from Aldrich), diphenyloxide disulfonate, naphthalene formaldehyde condensate, DOWFAX (available from Dow), dihexylsulfosuccinate, and dioctylsulfosuccinate, alkyl naphthalene sulfonate condensates, and salts thereof, and combinations thereof.

Non-limiting examples of nonionic dispersants include sorbitan esters, ethoxylated sorbitan esters, alkoxylated alkylphenols, alkoxylated alcohols, block copolymer ethers, lanolin derivatives, and combinations thereof. Some further non-limiting examples of nonionic dispersants include SPAN™ 20, SPAN™ 40, SPAN™ 80, SPAN™ 65, and SPAN™ 85 (available from Aldrich); TWEEN® 20, TWEEN® 40, TWEEN® 60, TWEEN® 80, and TWEEN® 85 (available from Aldrich); IGEPAL® CA-210, IGEPAL® CA-520, IGEPAL® CA-720, IGEPAL® CO-210, IGEPAL® CO-520, IGEPAL® CO-630, IGEPAL® CO-720, IGEPAL® CO-890, and IGEPAL® DM-970 (available from Aldrich); Triton™ X-100 (available from Aldrich); BRIJ S10®, BRIJ® S20, BRIJ® 30, BRIJ® 52, BRIJ® 56, BRIJ® 58, BRIJ 72, BRIJ® 76, BRIJ® 78, BRIJ 92V, BRIJ® 97, and BRIJ® 98 (available from Aldrich); PLURONIC® L-31, PLURONIC® L-35, PLURONIC® L-61, PLURONIC® L-81, PLURONIC® L-64, PLURONIC® L-121, PLURONIC® 10R5, PLURONIC® 17R4, and PLURONIC® 31R1 (available from Aldrich); Atlas™ G-5000 and Atlas™ G-5002L (available from Croda); ATLOX® 4912 and ATLOX® 4912-SF (available from Croda); and SOLUPLUS® (available from BASF), LANEXOL™ AWS (available from Croda).

Non-limiting examples of cationic dispersants include mono alkyl quaternary amine, fatty acid amide surfactants, amidoamine, imidazoline, polymeric cationic surfactants, and combinations thereof.

The concentration of the dispersant component in the concentrate compositions of the present disclosure may be about 1 wt. %, about 1.5 wt. %, about 2 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3 wt. %, about 3.1 wt. %, about 3.2 wt. %, about 3.3 wt. %, about 3.4 wt. %, about 3.5 wt. %, about 4 wt. %, about 4.5 wt. %, about 4.6 wt. %, about 4.7 wt. %, about 4.8 wt. %, about 4.9 wt. %, about 5 wt. %, about 5.1 wt. %, about 5.2 wt. %, about 5.3 wt. %, about 5.4 wt. %, about 5.5 wt. %, about 6 wt. %, about 7 wt. %, about 8 wt. %, about 9 wt. %, or about 10 wt. %, and ranges constructed therefrom, such as from about 1 wt. % to about 10 wt. %, from about 2 wt. % to about 8 wt. %, from about 2 wt. % to about 5 wt. %, from about 2 wt. % to about 5 wt. %, or from about 1 wt. % to about 4 wt. %.

Surface-Acting Agents

The concentrate compositions of the present disclosure may comprise one or more surface-acting agents including emulsifiers and wetting agents.

Emulsifiers generally reduce surface tension between two or more immiscible liquids thereby stabilizing a suspension of droplets of one liquid phase in another liquid phase (emulsion). An example is an oil-in-water emulsion. Non-limiting examples of emulsifiers include polyethylene oxide esters of fatty acids, polyethylene oxide ethers of fatty alcohols, alkyl sulfates, alkyl sulfonates, aryl sulfonates, alkyl arylpolyglycol ethers, and combinations thereof. Non-limiting examples of specific emulsifiers include Ultraric® 5000 (EO/PO butyl alcohol), Surfom® R400 (ethoxylated castor oil), and Ninate® 60E (dodecylbenzenesulfonic acid in 2-ethyl hexanol), and combinations thereof.

The concentration of the emulsifier component in the concentrate compositions of the present disclosure may be about 0.5 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %, and ranges constructed therefrom, such as from about 0.5 wt. % to about 10 wt. %, from about 1 wt. % to about 10 wt. %, from about 2 wt. % to about 8 wt. %, from about 2 wt. % to about 6 wt. %, or from about 3 wt. % to about 5 wt. %.

A wetting agent is a surface-acting agent which reduces the surface tension of a liquid (e.g., water) and a surface on which it is spreading. Wetting agents may be considered to be emulsifiers. Non-limiting examples of wetting agents include alkyl sulphate salts (e.g., sodium lauryl sulphate; alkyl sulphosuccinate salts (e.g., sodium dioctyl sulphosuccinate), alkyl phenol ethoxylates, aliphatic alcohol ethoxylates; and alkyl glycosides, and combinations thereof. A non-limiting example of a specific wetting agent is Agnique® PG 9116 (D-glucopyranose, oligomeric, $C_9$-$C_{11}$ alkyl glycoside).

The concentration of the wetting agent component in the concentrate compositions of the present disclosure may be about 0.5 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, or about 12 wt. %, and ranges constructed therefrom, such as from about 0.5 wt. % to about 10 wt. %, from about 1 wt. % to about 10 wt. %, from about 2 wt. % to about 8 wt. %, from about 4 wt. % to about 9 wt. %, from about 4 wt. % to about 8 wt. %, or from about 5 wt. % to about 7 wt. %.

Rheology Modifier Component

The concentrate compositions of the present disclosure may comprise a rheology modifier component comprising at least one rheology modifier.

Rheology modifiers, including thickeners, may be a solid, a semi-solid, or a liquid. Non-limiting examples of rheology modifiers include fatty alcohols, fatty acids, carboxymethylcellulose and salts thereof, poly(vinyl pyrrolidone), carboxyvinyl polymer, acrylic polymer, starch derivatives (e.g., dextrin and water-soluble starches), polysaccharides, sorbitan fatty acid esters, sucrose fatty acid esters, polyoxyethylene fatty acid esters, polyoxyethylene resinate esters, polyoxyethylene alkyl ethers, polyoxyethylene alkylphenyl ethers, polyoxyethylene-polyoxypropylene block copolymers, alkyl polyoxyethylene-polypropylene block copolymer ethers, polyoxyalkylene styrylphenyl ethers, polyoxyethylene castor oils, hydrogenated polyoxyethylene castor oils, anionic surfactants (e.g., alkyl sulfate salts, alkylbenzene sulfonate salts, lignin sulfonate salts, alkylsulfosuccinate salts, naphthalene sulfonate salts, alkylnaphthalene sulfonate salts, salts of naphthalenesulfonic acid-formalin condensate, and salts of alkylnaphthalene sulfonic acid-formalin condensate), waxes, gums, clays, gelatin, and combinations thereof. Non-limiting examples of specific rheological modifiers include Kelzan® S Plus (xanthan gum), Madeol® X80 (xanthan gum), Bentone SD®-2 (bentonite clay), and Veegum® R (smectite clay).

The concentration of the rheology modifying component in the concentrate compositions of the present disclosure may be about 0.05 wt. %, about 0.06 wt. %, about 0.07 wt. %, about 0.08 wt. %, about 0.09 wt. %, about 0.1 wt. %, about 0.11 wt. %, about 0.12 wt. %, about 0.13 wt. %, about 0.14 wt. %, about 0.15 wt. %, about 0.2 wt. %, about 0.25 wt. %, about 0.3 wt. %, about 0.35 wt. %, about 0.4 wt. %, about 0.45 wt. %, about 0.5 wt. %, about 0.51 wt. %, about 0.52 wt. %, about 0.53 wt. %, about 0.54 wt. %, about 0.55 wt. %, about 0.6 wt. %, about 0.65 wt. %, about 0.7 wt. %, about 0.8 wt. %, about 0.9 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 6 wt. %, about 7 wt. %, about 7.5 wt. %, about 8 wt. %, about 9 wt. %, about 10 wt. %, about 11 wt. %, or about 12 wt. %, and ranges constructed therefrom, such as from about 0.05 wt. % to about 5 wt. %, from about 0.1 wt. % to about 5 wt. %, from about 0.1 wt. % to about 1 wt. %, from about 1 wt. % to about 12 wt. %, or from about 5 wt. % to about 10 wt. %.

Other Components

The concentrate compositions of the present disclosure may further comprise an antifoam component comprising at least one antifoam compound, a biocide component comprising at least one biocide compound, an antifreeze component comprising at least one antifreeze compound, a pH adjuster component comprising an acid or a base, and combinations thereof.

Antifoams which are suitable for the compositions of the present disclosure are generally known in the art. Non-limiting examples include silicone oils (e.g., polydimethylsiloxanes), stearates (e.g., magnesium stearate), vegetable oils, acetylenic glycols, glycols, long-chain alcohols, and combinations thereof. Non-limiting examples of specific antifoams include Xiameter® AFE-0100 (polydimethylsiloxane) and Silfoam® SRE (polydimethylsiloxane). The antifoam concentration may be about 0.05 wt. %, about 0.1 wt. %, about 0.15 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.5 wt. %, or about 2 wt. %, and ranges constructed therefrom, such as from about 0.05 wt. % to about 2 wt. %, or from about 0.1 wt. % to about 1 wt. %.

Biocides which are suitable for the compositions of the present disclosure are generally known in the art. Non-limiting examples of biocides include, bactericides such as Acticide® LA 1209 (mixture of bronopol, 5-chloro-2-methyl-2H-isothiazol-3-one and 2-methyl-2H-isothiazol-3-one), Acticide® SPX (reaction mass of 5-chloro-2-methyl-2H-isothiazol-3-one and 2-methyl-2H-isothiazol-3-one), Legend™ MK (mixture of 5-chloro-2-methyl-3(2H)-isothiazolone with 2-methyl-3(2H)-isothiazolone), EDTA (ethylenediamine-tetraacetic acid), formaldehyde, benzoic acid, or 1,2-benzisothiazol-3(2H)-one or its salts, e.g., Proxel® BD or Proxel® GXL (Arch), Proxel® GXL, Kathon™ CG/ICP and Kathon™ CG/ICP II. The biocide concentration may be about 0.05 wt. %, about 0.06 wt. %, about 0.07 wt. %, about 0.08 wt. %, about 0.09 wt. %, about 0.1 wt. %, about 0.11 wt. %, about 0.12 wt. %, about 0.13 wt. %, about 0.14 wt. %, about 0.15 wt. %, about 0.2 wt. %, about 0.3 wt. %, about 0.4 wt. %, about 0.5 wt. %, or about 1 wt. %, and ranges constructed therefrom, such as from about 0.05 wt. % to about 1 wt. %, or from about 0.01 wt. % to about 0.5 wt. %.

Antifreeze compounds which are suitable for the compositions of the present disclosure include are generally known in the art. Non-limiting examples of antifreeze compounds include, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. The antifreeze concentration may be about 1 wt. %, about 2 wt. %, about 3 wt. %, about 4 wt. %, about 5 wt. %, about 6 wt. %, about 7 wt. %, about 8 wt. %, about 9 wt. %, or about 10 wt. %, and ranges constructed therefrom, such as from about 1 wt. % to about 10 wt. %, from about 2 wt. % to about 8 wt. %, or from about 4 wt. % to about 6 wt. %.

pH adjusters which are suitable for the compositions of the present disclosure include, for example and without limitation, citric acid, tartaric acid, mandelic acid, acetic acid, succinic acid, hydrochloric acid, phosphoric acid, sulfuric acid, sodium hydrogen sulfate, ammonium hydroxide, sodium hydroxide.

Concentrate Compositions

SC Compositions

In one non-limiting aspect, the SC compositions of the present disclosure may be prepared in an agitated vessel or tank as follows. Inert ingredients such as dispersants, wetting agents, and antifoams may be dissolved in water, to which technical bifenthrin and chlorantraniliprole is added. The resulting slurry may then be wet milled to form a millbase having a particle size d50 less than 10 μm, such as less than 5 μm, or less than 2.5 μm. The millbase may be further formulated by adding other ingredients such as anti-freeze, pH adjuster, thickener, and biocide. In some other aspects, the millbase may also made by milling in the presence of anti-freeze, to the desired particle size, followed by addition of thickener and biocide. The SC formulation can also be made by milling in the presence of antifreeze, and thickener and biocide.

In another non-limiting aspect, the SC composition aspect of the present disclosure may be prepared from a base comprising bifenthrin and chlorantraniliprole. For instance, and without limitation, a base was made with the components listed in Table A below in the recited order with the exception of chlorantraniliprole. Bifenthrin (waxy solid) was slowly added to the other components of the base. The base was stirred for a period of time to completely recrystallize the bifenthrin in the base (e.g., 3 hours). Chlorantraniliprole was then added to the base followed by wet milling

TABLE A

| Component | Purpose | % in Premix | Weight (g) |
|---|---|---|---|
| Water | Carrier | 47.73 | 715.95 |
| Silfoam ® SRE | Antifoam | 0.8 | 12 |

TABLE A-continued

| Component | Purpose | % in Premix | Weight (g) |
|---|---|---|---|
| Nipacid BIT 40 | Preservant | 0.11 | 1.65 |
| Polyfon ® H | Dispersant | 1 | 15 |
| Propylene glycol | Antifreeze | 6 | 90 |
| Ultraric ® 5000 | Emulsifier | 2.5 | 37.5 |
| Atlox ® 4913 | Dispersant | 2 | 30 |
| Chlorantraniliprole (technical 95%) | Insecticide | 6.8 | 102 |
| Bifenthrin (technical 96%) | Insecticide | 27.06 | 405.9 |
| Base total | | 94 | 1410 |
| Base SC | | 94 | |
| Xanthan gum (2%) | Rheology Agent | 6 | |
| Total | | 100 | |

SE Compositions

In one non-limiting aspect, the SE concentrate compositions of the present disclosure may be prepared by combining an emulsion concentrate ("EC") base containing bifenthrin and adjuvants with an EC base containing chlorantraniliprole and adjuvants. For instance, and without limitation, below in Tables B and C are two example preparations of SE compositions of the present disclosure. The SC base was prepared by adding the components in the order listed with mixing. The SC base was prepared by adding the components in the order listed with mixing (bifenthrin was a waxy solid). The EC base was mixed and the SC base was added thereto slowly with mixing.

TABLE B

SE Example composition 1

| Component | Purpose | % in Premix | Weight (g) |
|---|---|---|---|
| SC Base | | | |
| Water | Carrier | 19.05 | 190.5 |
| Silfoam ® SRE | Antifoam | 0.15 | 1.5 |
| Nipacid BIT 40 | Preservant | 0.2 | 2 |
| Veegum ® R | Dispersant | 0.4 | 4 |
| Propylene glycol | Antifreeze | 4 | 40 |
| Polyfon ® H | Dispersant | 0.8 | 8 |
| Atlox ® 4915 | Dispersant | 1.5 | 15 |
| Chlorantraniliprole (technical 95%) | Insecticide | 6.8 | 68 |
| SC Base total | | 32.9 | 329 |
| EC Base | | | |
| Disflamoll ® TOF | Adjuvant | 19 | 190 |
| Solvesso ® 200ND | Co-solvent | 11 | 110 |
| Surfom ® R400 | Emulsifier | 1 | 10 |
| Ultraric ® 5000 | Emulsifier | 1 | 10 |
| Ninate ® 60E | Emulsifier | 1.5 | 15 |
| Bifenthrin (technical 96%) | Insecticide | 27.6 | 276 |
| EC Base total | | 61.1 | 611 |
| Base SC | | 32.9 | |
| Base EC | | 61.1 | |
| Xanthan gum (2%) | Rheology Agent | 6 | |
| Total | | 100 | |

TABLE C

SE Example composition 2

| Component | Purpose | % in Premix | Weight (g) |
|---|---|---|---|
| SC Base | | | |
| Water | Carrier | 19.05 | 190.5 |
| Silfoam ® SRE | Antifoam | 0.15 | 1.5 |
| Nipacid BIT 40 | Preservant | 0.2 | 2 |
| Veegum ® R | Dispersant | 0.4 | 4 |
| Propylene glycol | Antifreeze | 4 | 40 |
| Polyfon ® H | Dispersant | 0.8 | 8 |
| Atlox ® 4915 | Dispersant | 1.5 | 15 |
| Chlorantraniliprole (technical 95%) | Insecticide | 6.8 | 68 |
| SC Base total | | 32.9 | 329 |
| EC Base | | | |
| Solvesso ® 200ND | Co-solvent | 30 | 300 |
| Surfom ® R400 | Emulsifier | 1 | 10 |
| Ultraric ® 5000 | Emulsifier | 1 | 10 |
| Ninate ® 60E | Emulsifier | 1.5 | 15 |
| Bifenthrin (technical 96%) | | 27.6 | 276 |
| EC Base total | | 61.1 | 611 |
| Base SC | | 32.9 | |
| Base EC | | 61.1 | |
| Xanthan gum (2%) | Rheology Agent | 6 | |
| Total | | 100 | |

OD Compositions

In one non-limiting aspect, the OD compositions of the present disclosure may be prepared in an agitated vessel or tank as follows. Two separate bases were prepared: one for the dispersion of chlorantraniliprole; and one for the bifenthrin stabilization (waxy solid). In the dispersion base, the components soya methyl ester, Bentone® SD02, Morwet® D360 and chlorantraniliprole were added in order of description in Table D and Table E below. The base was then wet milled. In the bifenthrin base, bifenthrin and Solvesso® were combined followed by addition of the remainder of the components indicated in Tables D and E. The chlorantraniliprole dispersion base was mixed and the bifenthrin was added thereto slowly with mixing.

TABLE D

| Component | Purpose | % in Premix | Weight (g) |
|---|---|---|---|
| Soya methyl ester | Carrier | 28.1 | 281 |
| Solvesso ® 200ND | Solvent | 30 | 300 |
| Bentone ® SD02 | Rheological agent | 0.5 | 5 |
| Morwet ® D400 | Dispersant | 1.5 | 15 |
| Surfom ® R400 | Emulsifier | 1.5 | 15 |
| Ninate ® 60E | Emulsifier | 2.5 | 25 |
| Ultraric ® 5000 | Dispersant | 1.5 | 15 |
| Chlorantraniliprole (technical 95%) | Insecticide | 6.8 | 68 |
| Bifenthrin (technical 96%) | Insecticide | 27.6 | 276 |
| Total | | 100 | 1000 |

TABLE E

| Component | Purpose | % in Premix | Weight (g) |
|---|---|---|---|
| Soya methyl ester | Carrier | 24.5 | 245 |
| Disflamoll ® TOF | Adjuvant | 20 | 200 |
| Solvesso ® 200ND | Solvent | 15.35 | 153.5 |
| Bentone ® SD02 | Rheological agent | 1 | 10 |
| Morwet ® D400 | Dispersant | 1.5 | 15 |
| Surfom ® R400 | Emulsifier | 1.5 | 15 |
| Ninate ® 60E | Emulsifier | 2.5 | 25 |
| Ultraric ® 5000 | Dispersant | 1.5 | 15 |
| Chlorantraniliprole (technical 95%) | Insecticide | 7 | 70 |
| Bifenthrin (technical 96%) | Insecticide | 25.15 | 251.5 |
| Total | | 100 | 1000 |

Tank Mixes

Tank mixes within the scope of the present disclosure comprise a mixture of bifenthrin and chlorantraniliprole and one or more adjuvants. The tank mix may further be diluted with water or other carriers suitable for spraying. These additional adjuvants are commonly known as "spray adjuvants" or "tank-mix adjuvants", and include any substance added to a tank mix to improve the performance of a pesticide or alter the physical properties of the tank mix. Adjuvants can be surfactants, emulsifying agents, petroleum-based crop oils, crop-derived seed oils, pH adjusters, thickeners, spreader stickers and/or defoaming agents, as described elsewhere herein. Adjuvants may be used to enhance efficacy (e.g., biological availability, adhesion, penetration, uniformity of coverage and durability of protection), or minimize or eliminate spray application problems associated with incompatibility, foaming, drift, evaporation, volatilization and degradation. To obtain optimal performance, adjuvants are selected with regard to the properties of the active ingredient, formulation and target (e.g., crops, insect pests). Representative exemplary surfactants include Silwet® (Helena Chemical Company) polyalkyleneoxide modified heptamethyltrisiloxane and Assist® (BASF) 17% surfactant blend in 83% paraffin based mineral oil.

Among the tank mix adjuvants, oils including crop oils, crop oil concentrates, vegetable oil concentrates and methylated seed oil concentrates are most commonly used to improve the efficacy of pesticides, possibly by means of promoting more even and uniform spray deposits. In situations where phytotoxicity potentially caused by oils or other water-immiscible liquids are of concern, tank mix compositions prepared from the composition of the present disclosure will generally not contain oil-based adjuvants. However, in situations where phytotoxicity caused by oil-based adjuvants is commercially insignificant, tank mix compositions prepared from the composition of the present composition can also contain oil-based adjuvants, which can potentially further increase control of invertebrate pests, as well as rainfastness.

Products identified as "crop oil" typically contain 95 to 98% paraffin or naphtha-based petroleum oil and 1 to 2% of one or more surfactants functioning as emulsifiers. Products identified as "crop oil concentrates" typically consist of 80 to 85% of emulsifiable petroleum-based oil and 15 to 20% of nonionic surfactants. Products correctly identified as "vegetable oil concentrates" typically consist of 80 to 85% of vegetable oil (i.e., seed or fruit oil, most commonly from cotton, linseed, soybean or sunflower) and 15 to 20% of nonionic surfactants. In some aspects, adjuvant performance can be improved by replacing the vegetable oil with methyl esters of fatty acids that are typically derived from vegetable oils. Examples of methylated seed oil concentrates include MSO® Concentrate (UAP-Loveland Products, Inc.), Premium MSO Methylated Spray Oil (Helena Chemical Company), and Adigor® (Syngenta) 47% methylated rapeseed oil in liquid hydrocarbons.

The amount of adjuvants added to tank mixes generally does not exceed about 2.5% by volume, and more typically the amount is from about 0.1 to about 1% by volume. The application rates of adjuvants added to tank mixes are typically between about 1 to 5 L per hectare.

Plants and Insects

These present compositions are thus useful for protecting agronomic field crops other non-agronomic horticultural crops and plants from invertebrate pests. This utility includes protecting crops and other plants (i.e. both agronomic and nonagronomic) that contain genetic material introduced by genetic engineering (i.e. transgenic) or modified by mutagenesis to provide advantageous traits. Examples of such traits include tolerance to herbicides, resistance to phytophagous pests (e.g., insects, mites, aphids, spiders, nematodes, snails, plant-pathogenic fungi, bacteria and viruses), improved plant growth, increased tolerance of adverse growing conditions such as high or low temperatures, low or high soil moisture, and high salinity, increased flowering or fruiting, greater harvest yields, more rapid maturation, higher quality and/or nutritional value of the harvested product, or improved storage or process properties of the harvested products. Transgenic plants can be modified to express multiple traits. Examples of plants containing traits provided by genetic engineering or mutagenesis include varieties of corn, cotton, soybean and potato expressing an insecticidal Bacillus thuringiensis toxin such as YIELD GARD®, KNOCKOUT®, STARLINK®, BOLLGARD®, NuCOTN® and NEWLEAF®, INVICTA RR2 PRO™, and herbicide-tolerant varieties of corn, cotton, soybean and rapeseed such as ROUNDUP READY®, LIBERTY LINK®, IMI®, STS® and CLEARFIELD®, as well as crops expressing N-acetyltransferase (GAT) to provide resistance to glyphosate herbicide, or crops containing the HRA gene providing resistance to herbicides inhibiting acetolactate synthase (ALS). The present compositions may interact synergistically with traits introduced by genetic engineering or modified by mutagenesis, thus enhancing phenotypic expression or effectiveness of the traits or increasing the invertebrate pest control effectiveness of the present compounds and compositions. In particular, the present compositions may interact synergistically with the phenotypic expression of proteins or other natural products toxic to invertebrate pests to provide greater-than-additive control of these pests, i.e. produce a combined effect greater than the sum of their separate effects.

Plants within the scope of the present disclosure include crops, vegetables, fruits, trees other than fruit trees, lawn, and other uses (flowers, biofuel plants and ornamental foliage). Crops include: corn, rice, wheat, barley, rye, oat, sorghum, cotton, soybean, peanut, buckwheat, beet, rapeseed, sunflower, sugar cane, tobacco, and others known in the art. Vegetables include: solanaceous vegetables (for example, eggplant, tomato, pimento, pepper and potato); cucurbitaceous vegetables (for example, cucumber, pumpkin, zucchini, water melon, and melon); cruciferous vegetables (for example, Japanese radish, white turnip, horseradish, kohlrabi, Chinese cabbage, cabbage, leaf mustard, broccoli, and cauliflower); asteraceous vegetables (for example, burdock, crown daisy, artichoke and lettuce); liliaceous vegetables (for example, green onion, onion, garlic and asparagus); ammiaceous vegetables (for example, carrot, parsley, celery and parsnip); chenopodiaceous vegetables (for example, spinach and Swiss chard); and lamiaceous vegetables (for example, *Perilla frutescens*, mint and basil). Fruits include: pomaceous fruits (for example, apple, pear, Japanese pear, Chinese quince and quince); stone fleshy fruits (for example, peach, plum, nectarine, *Prunus mume*, cherry fruit, apricot and prune); citrus fruits (for example, Citrus unshiu, orange, lemon, lime and grapefruit); nuts (for example, chestnut, walnuts, hazelnuts, almond, pistachio, cashew nuts and macadamia nuts); berry fruits (for example, blueberry, cranberry, blackberry, strawberry, and raspberry); grape; kaki; persimmon; olive; Japanese plum; banana; coffee; date palm; coconuts; and oil palm. Trees other than fruit trees include: tea; mulberry; and other trees (for example, ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea, Taxus* cuspidate, elm and Japanese horse chestnut), Sweet *viburnum, Podocarpus macrophyllus*, Japanese cedar, Japanese cypress, croton, Japanese spindletree, and *Photinia glabra*). Lawn uses include: sods (for example, *Zoysia japonica, Zoysia matrella*); bermudagrasses; bent grasses; festucae; ryegrasses. Flower uses include: rose, carnation, *chrysanthemum, Eustoma, gypsophila, gerbera*, marigold, *salvia, petunia, verbena*, tulip, aster, gentian, lily, pansy, cyclamen, orchid, lily of the valley, lavender, stock, ornamental cabbage, *primula*, poinsettia, *gladiolus*, cattleya, daisy, cymbidium and *begonia*. Bio-fuel plants include: jatropha, safflower, Camelina, switch grass, *Miscanthus giganteus, Phalaris arundinacea, Arundo donax*, kenaf, cassava, and willow In the case of corn (filed, pop and seed), the compositions of the present disclosure are useful for controlling: Grasshoppers; Aphids; corn leaf beetle; Cereal leaf beetle; Chinch bug; Corn rootworm adults; Cucumber beetle adult; Cutworm species; Flea beetle; Greenbug; Japanese beetle adult; Sap beetle; Southern corn leaf; beetle; Stinkbugs; Tarnished plant bug; Western bean cutworm; Army cutworm; Corn earworm; Common stalk borer; Beet armyworm; European corn borer; Fall armyworm; Southern armyworm; Southwestern corn borer; Sugarcane borer adults; True armyworm or Armyworm species; Webworms; Yellowstriped armyworm; Banks grass mite; Brown marmorated stink bug; Carmine mite; and Twospotted spider mite. The compositions of the present disclosure are useful for controlling sucking pests (e.g., plant bugs and aphids). It is believed that the compositions of the present disclosure provide improved long residual control of keys pests in Bt and non-Bt varieties.

In the case of cotton, the compositions of the present disclosure are useful for controlling: Boll weevil; Cotton aphid; Cotton fleahopper; Cotton leafperforator; Cutworm species; Grasshoppers; Plant bugs; Southern garden leafhopper; Soybean (banded) *thrips*; Stink bugs; Tobacco *thrips*; Beet armyworm; Cabbage looper; Cotton bollworm; Fall armyworm; Pink bollworm; Saltmarsh caterpillar; Southern armyworm; Soybean looper; Tobacco budworm; Western yellowstriped armyworm; *Lygus* spices; Carmine spider mite; Twospotted spider mite; and Whitefly. It is believed that the compositions of the present disclosure provide improved long residual control of key pests in soybean including: Bt resistant bollworms and other Lepidoptera pests; enhanced and/or protected yield when used on 2 and 3 gent Bt varieties exposed to resistant bollworms; sucking pests (plant bugs, leafhoppers, and three-cornered alfalfa hopper); and mites (suppression and no flare). Moreover, the compositions of the present disclosure provide the freedom to select cotton varieties that are best for the land under cultivation and to secure optimal ling potential.

In the case of corn (sweet), the compositions of the present disclosure are useful for controlling: Cereal leaf; beetle Cutworm species; Chinch bug; Corn rootworm adults; Cucumber beetle adult; Flea beetle; Greenbug; Grasshoppers; Japanese beetle adult; Sap beetle; Southern corn leaf beetle; Stinkbugs; Tarnished plant bug; Western bean cutworm; Army cutworm; Common stalk borer; Corn earworm; Beet armyworm; European corn borer; Fall armyworm; Southern armyworm; Southwestern corn borer; True armyworm or Armyworm species; Webworms; Yellowstriped armyworm; Banks grass mite; Brown marmorated stink bug; Carmine mite; and Twospotted spider mite.

In the case of peanuts, the compositions of the present disclosure are useful for controlling: Cutworm species; Green cloverworm; Grasshoppers; Leafhoppers; Southern corn rootworm; Stink bugs; Rednecked peanut worm; Threecornered alfalfa hopper; Velvetbean caterpillar; Cabbage looper; Corn earworm; Beet armyworm; Fall armyworm; Granulate cutworm; Lesser cornstalk borer; Soybean looper; Southern armyworm; Tobacco budworm; Yellowstriped armyworm; Aphids; Spider mites; *Thrips*; and Whitefly.

In the case of succulents, the compositions of the present disclosure are useful for controlling: Cutworms; Cloverworm; Grasshoppers; Flea beetle; Aster; Leafhopper; Leafhoppers; Alfalfa caterpillar; Corn earworm; Beet armyworm; European corn borer; Fall armyworm; Cabbage looper; Soybean looper; Southern armyworm; Yellowstriped armyworm; Webworms; Western bean cutworm; Aphids; Bean leaf beetle; Cucumber beetles; Japanese beetle; Adult sap beetle; Stink bugs; Corn rootworm adult; *Thrips*; Pea weevil; Pea leaf weevil; Plant bugs; Banks grass mite; Twospotted spider mite; Carmine mite; *Lygus* species; Leafminers; and Silverleaf whitefly. Succulents include: Pea (*Pisum* spp.): Dwarf pea; Edible-pod pea; English pea; Garden pea; Snow pea; Sugar snap pea; Pigeon pea; Bean (*phaseolus* spp,); Broadbean succulent); Lima bean (green); Runner Bean; Snap bean; Wax bean (*Vigna* spp.); Asparagus bean; Blackeyed pea; Chinese longbean; Cowpea; Moth bean; Southern pea; Yardlong bean; Jackbean; Soybean (immature seed); and Sword Bean.

In the case of dried cultivars, the compositions of the present disclosure are useful for controlling: Cutworms; Cloverworm; Grasshoppers; Flea beetle; Aster leafhopper; Leafhoppers; Alfalfa caterpillar; Corn earworm; Beet armyworm; European corn borer; Fall armyworm; Cabbage looper; Soybean looper; Southern armyworm; Yellowstriped armyworm; Webworms; Western bean cutworm; Aphids; Bean leaf beetle; Cucumber beetles; Japanese beetle; Sap beetle adult; Stink bugs; Corn rootworm; adult *Thrips*; Pea weevil; Pea leaf weevil; Plant bugs; Banks grass mite; Twospotted spider mite; Carmine mite; *Lygus* species; Leafminers; and Silverleaf whitefly. Dried cultivars include: Bean (*Lupinus*); Bean (*Phaseolus*); Field bean; Kidney bean; Lima bean (dry); Navy bean; Pinto bean; Tepary bean; Bean (*Vigna*); Adzuki bean; Blackeyed pea; Catjang; Cowpea; Crowder pea; Moth bean; Mung bean; Rice bean; Southern pea; Urd bean; Broad bean (dry); Chickpea; Guar; Lablab bean; Lentil, Pea (Piscum); Field pea; and Pigeon pea.

In the case of root, tuber and vegetable crops, the compositions of the present disclosure are useful for controlling: Beet armyworm; Western yellowstriped armyworm; Corn earworm; Cross-striped cabbageworm; Cutworms; Diamondback moth; European corn borer; Fall armyworm; Green cloverworm; Hornworms; Imported cabbageworm; Loopers; Southern armyworm; Tobacco budworm; Velvetbean caterpillar; Flea beetles; Click beetles; Cucumber beetles; White fringed beetles; May/June beetles; Sugarcane beetles; Aphids; Celery leaftier; Fire Ants; Flea Beetles; Spider mites; Silverleaf; and whitefly. Root, tuber and vegetable crops include: Burdock, edible; Carrot; Celeriac; Chervil; turnip rooted; Chicory; *Ginseng*; Garden beets; Horseradish; Parsley; turnip rooted Parsnip; Radish; Radish, oriental; Rutabaga; Salsify; Salsify, black; Salsify, Spanish; Skirret, Turnip; Sweet potato; Arracacha; Arrowroot; Chinese artichoke; Jerusalem artichoke; Edible *canna*; Cassava (bitter and sweet); Chayote (root); Chufa; Dasheen (taro); Ginger; Leren; Tanier; Turmeric; Yam bean; and True yam.

In the case of potato, the compositions of the present disclosure are useful for controlling: Grasshoppers; Beet and yellowstriped armyworms; Cabbage looper; Colorado potato beetle; European corn borer; Potato tuberworm; Flea beetles; Click beetles; Cucumber beetles; White fringed beetles; and May/June beetles.

In the case of soybeans, the compositions of the present disclosure are useful for controlling: Aphids; Bean leaf beetle; Blister beetle spp.; Cabbage looper; Corn earworm; Corn rootworm adult; Cowpea curculio; Cucumber beetle adult; Cutworms; False chinch bug; Flea beetle; Grasshoppers; Green cloverworm; Green stinkbug; Southern green stinkbug; Japanese beetle adult; Leaf skeletonizer species; Leafhoppers; Mexican bean beetle; Painted lady (thistle); caterpillar; Pea leaf weevil; Saltmarsh; caterpillar; Seedcorn maggot adult; Spittlebug; Stink Bug; Three-Cornered alfalfa Hopper; *Thrips*; Velvetbean caterpillar; Woollybear caterpillar; Alfalfa caterpillar; Armyworms; Beet armyworm; Fall armyworm; Dectes stem borer; European corn borer; Lesser cornstalk borer; Silverspotted skipper; Southern armyworm; Soybean looper; Tobacco budworm; Webworm; *Lygus* species; Brown marmorated stink bug; Redbanded stink bug; Whitefly; and Two spotted spider mites. It is believed that the compositions of the present disclosure provide improved long residual control of key pests in soybean including: stink bugs and soybean aphids; chewing pests such as worms (pod and leaf feeders), beetles (leaf beetles, flea beetles, Dectes stem borer, and weevils), and grasshoppers; sucking pests (plant bugs, leafhoppers, and three-cornered alfalfa hopper); and mites (suppression and no flare).

In the case of tobacco, the compositions of the present disclosure are useful for controlling: Aphid spp.; Cutworm species; Flea beetle (adults); Chinch bugs; Stink bugs; Japanese beetles; Grasshoppers; Green bugs; *Thrips*; Cucumber beetle; Armyworm species; Saltmarsh caterpillar; Split worm; (potato tuberworm); Tobacco budworm; Tomato hornworm; Tobacco hornworm; Spider mites; *Lygus* species; and Whiteflies.

In the case of pecan trees, the compositions of the present disclosure are useful for controlling: Black pecan aphid; Leaffooted bugs; Pecan *phylloxera*; Plant bugs; Stink bugs; Yellow pecan aphid; Hickory shuckworm; Pecan nut casebearer; Pecan leaf; casebearer; fire ants; Pecan weevil; and Spider mite species.

Application

To achieve contact and control of phytophagous pests, premixes or tank mixes of the present disclosure may be applied to plant foliage (e.g., leaves, stems, flowers and/or fruits). In some aspects, premixes are applied. In certain applications, the formulations may be applied to plant roots (such as by a soil drench or by a nursery box treatment or a dip of transplants) and/or to seeds. Compounds of the disclosure may also be effective by localized application to a locus of infestation.

In some aspects, premix or tank mix formulations may be suitable for foliar use by aerial or ground application. Spray volumes can range from about one to several thousand liters per hectare, but more typically are in the range from about ten to several hundred liters per hectare. In some aspects, premix or tank mix formulations can be metered directly into drip irrigation systems or metered into the furrow during planting. In some aspects, premix or tank mix formulations can be applied onto seeds of crops and other desirable vegetation as seed treatments before planting in order to protect developing roots and other subterranean plant parts and/or foliage through systemic uptake.

In one aspect, the liquid formulation compositions disclosed herein are suitable for use in a drip irrigation systems, furrow during planting, handheld sprayers, backpack sprayers, boom sprayers, ground sprayers, aerial application, and unmanned aerial vehicles.

In some aspects of the disclosure, the plants are infested with insects prior to application of the compositions of the present disclosure. In some other aspects, the plants are not infested with the insects prior to application of the compositions of the present disclosure.

In general, the seasonal maximum application rate for chlorantraniliprole is 0.2 lb a.i./acre (food crops), 0.13 lb a.i./acre (rice), 0.5 lb a.i./acre (turf grass), and from 0.33 lb a.i./acre to 0.5 lb a.i./acre (ornamentals).

In general, the seasonal maximum application rate for bifenthrin is 0.4 lb a.i./acre. Typical application rates are 0.1 to 0.2 lb a.i./acre.

Some specific application rates and schedules are summarized in Table F below where: "No./Int." refers to the maximum number of applications per year and the minimum interval between applications in days; "Chloran." refers to the maximum single application rate in g a.i./ha for chlorantraniliprole as the sole insecticide; "Bifenthrin" refers to the maximum single application rate g a.i./ha for bifenthrin as the sole insecticide; "Chlor/Bifen minimum" refers to the minimum single application rate for compositions of the present disclosure; and "Chlor/Bifen maximum" refers to the maximum single application rate for compositions of the present disclosure.

TABLE F

| Crop | Method | No./Int. | Chloran. | Bifenthrin | Chlor/Bifen minimum | Chlor/Bifen maximum |
|---|---|---|---|---|---|---|
| Citrus | Foliar | 2/7 | 24.5 g a.i./ha | 98 g a.i./ha | 87.5 g a.i./ha | 122.5 g a.i./ha |
| Coffee | Foliar | 2/14 | 24.5 g a.i./ha | 98 g a.i./ha | 105 g a.i./ha | 122.5 g a.i./ha |
| Corn | Foliar* | 2/7 | 24.5 g a.i./ha | 98 g a.i./ha | 87.5 g a.i./ha | 122.5 g a.i./ha |
| Cotton | Foliar** | 2/7 | 19.3 g a.i./ha to 24.5 g a.i./ha | 77 g a.i./ha to 98 g a.i./ha | 61.3 g a.i./ha to 105 g a.i./ha | 96.3 g a.i./ha to 122.5 g a.i./ha |
| Drybean | Foliar | 2/7 | 24.5 g a.i./ha | 98 g a.i./ha | 87.5 g a.i./ha | 122.5 g a.i./ha |
| Soybean | Foliar* | 2/7 | 19.3 g a.i./ha to 24.5 g a.i./ha | 77 g a.i./ha to 98 g a.i./ha | 61.3 g a.i./ha to 87.5 g a.i./ha | 96.3 g a.i./ha to 122.5 g a.i./ha |

In Table F,
*refers to, in addition to foliar application, burndown may be done (where No./Int. is 1/N.A.) and
**refers to, in addition to foliar application, center pivot application (where No./Int. is 2/7).

Non-Agronomic Uses

Non-agronomic uses refer to invertebrate pest control in the areas other than fields of crop plants. Nonagronomic uses of the present compositions include control of invertebrate pests in stored grains, beans and other foodstuffs, and in textiles such as clothing and carpets. Nonagronomic uses of the present compositions also include invertebrate pest control in ornamental plants, forests, in yards, along roadsides and railroad rights of way, and on turf such as lawns, golf courses and pastures. Nonagronomic uses of the present compositions also include invertebrate pest control in houses and other buildings which may be occupied by humans and/or companion, farm, ranch, zoo or other animals. Nonagronomic uses of the present compositions also include the control of pests such as termites that can damage wood or other structural materials used in buildings.

Nonagronomic uses of the present compositions also include protecting human and animal health by controlling invertebrate pests that are parasitic or transmit infectious diseases. The controlling of animal parasites includes controlling external parasites that are parasitic to the surface of the body of the host animal (e.g., shoulders, armpits, abdomen, inner part of the thighs) and internal parasites that are parasitic to the inside of the body of the host animal (e.g., stomach, intestine, lung, veins, under the skin, lymphatic tissue). External parasitic or disease transmitting pests include, for example, chiggers, ticks, lice, mosquitoes, flies, mites and fleas. Internal parasites include heartworms, hookworms and helminths. of the present disclosure are suitable for systemic and/or non-systemic control of infestation or infection by parasites on animals. Compositions of the present disclosure are particularly suitable for combating external parasitic or disease transmitting pests. Compositions of the present disclosure are suitable for combating parasites that infest agricultural working animals, such as cattle, sheep, goats, horses, pigs, donkeys, camels, buffalos, rabbits, hens, turkeys, ducks, geese and bees; pet animals and domestic animals such as dogs, cats, pet birds and aquarium fish; as well as so-called experimental animals, such as hamsters, guinea pigs, rats and mice. By combating these parasites, fatalities and performance reduction (in terms of meat, milk, wool, skins, eggs, honey, etc.) are reduced, so that applying a composition of the present disclosure allows more economic and simple husbandry of animals.

Embodiments of this disclosure include:

Embodiment 1. An insecticidal concentrate composition, the composition comprising bifenthrin and chlorantraniliprole, wherein (i) the weight ratio of bifenthrin to chlorantraniliprole on an active ingredient basis is from about 10:1 to about 1:10;
(ii) the bifenthrin concentration is from about 10 wt. % to about 60 wt. %; and
(iii) the composition is a liquid, a dispersion, a suspension, or an emulsion.

Embodiment 2. The insecticidal composition of Embodiment 1 wherein the weight ratio of bifenthrin to chlorantraniliprole on an active ingredient basis is from about 1.5:1 to about 5:1.

Embodiment 3. The insecticidal composition of Embodiment 1 wherein the weight ratio of bifenthrin to chlorantraniliprole on an active ingredient basis is between about 3:1 and about 5:1.

Embodiment 4. The insecticidal composition of Embodiment 1 wherein the weight ratio of bifenthrin to chlorantraniliprole on an active ingredient basis is about 4:1.

Embodiment 5. The insecticidal composition of any one of Embodiments 1 to 4, further comprising an agriculturally acceptable carrier component comprising at least one carrier compound, an agriculturally acceptable adjuvant component comprising at least one adjuvant compound, or a combination thereof.

Embodiment 6. The insecticidal composition of any one of Embodiments 1 to 5, wherein the composition is selected from an oil dispersable composition, a suspension concentrate composition, and a suspoemulsion composition.

Embodiment 7. The insecticidal composition of Embodiment 5 or Embodiment 6, wherein the bifenthrin concentration is from about 10 wt. % to about 50 wt. % and wherein the chlorantraniliprole concentration is from about 2 wt. % to about 13 wt. %.

Embodiment 8. The insecticidal composition of Embodiment 7, wherein the bifenthrin concentration is from about 20 wt. % to about 40 wt. % and wherein the chlorantraniliprole concentration is from about 5 wt. % to about 10 wt. %.

Embodiment 9. The insecticidal composition of any one of Embodiments 1 to 8, wherein the composition is an oil dispersion, and wherein the composition comprises:
 (i) from about 20 wt. % to about 35 wt. % bifenthrin, and
 (ii) from about 5 wt. % to about 9 wt. % chlorantraniliprole;
 and wherein the composition further comprises
 (iii) from about 1 wt. % to about 10 wt. % of a dispersant component comprising at least one dispersant compound,
 (iv) from about 1 wt. % to about 10 wt. % of an emulsifier component comprising at least one emulsifier compound,
 (v) from about 0.1 wt. % to about 5 wt. % of a rheology modifier component comprising at least one rheology modifier compound,
 (vi) from about 10 wt. % to about 60 wt. % of a solvent component comprising at least one organic solvent compound, and
 (vii) from about 10 wt. % to about 60 wt. % of a carrier component comprising at least one organic carrier compound.

Embodiment 10. The insecticidal composition of Embodiment 9, comprising:
 (i) from about 25 wt. % to about 31 wt. % bifenthrin, and
 (ii) from about 6 wt. % to about 8 wt. % chlorantraniliprole;
 (iii) from about 2 wt. % to about 5 wt. % of the dispersant component;
 (iv) from about 2 wt. % to about 6 wt. % of the emulsifier component;
 (v) from about 0.1 wt. % to about 1 wt. % of the rheology modifier component;
 (vi) from about 20 wt. % to about 40 wt. % of the solvent component; and
 (vii) from about 20 wt. % to about 40 wt. % of the carrier component.

Embodiment 11. The insecticidal composition of Embodiment 10, comprising:
 (i) about 28 wt. % bifenthrin;
 (ii) about 7 wt. % chlorantraniliprole;
 (iii) about 3 wt. % of the dispersant component;
 (iv) about 4 wt. % of the emulsifier component;
 (v) about 0.5 wt. % of the rheology modifier component;
 (vi) about 30 wt. % of the solvent component; and
 (vii) about 27.5 wt. % of the carrier component.

Embodiment 12. The insecticidal composition of any one of Embodiments 1 to 8, wherein the composition is an oil dispersion, wherein the composition comprises:
 (i) from about 20 wt. % to about 35 wt. % bifenthrin, and
 (ii) from about 5 wt. % to about 9 wt. % chlorantraniliprole;
 and wherein the composition further comprises
 (iii) from about 1 wt. % to about 10 wt. % of a dispersant component comprising at least one dispersant compound;
 (iv) from about 1 wt. % to about 10 wt. % of an emulsifier component comprising at least one emulsifier compound;
 (v) from about 0.1 wt. % to about 5 wt. % of a rheology modifier component comprising at least one rheology modifier compound;
 (vi) from about 5 wt. % to about 30 wt. % of a solvent component comprising at least one organic solvent compound;
 (vii) from about 10 wt. % to about 60 wt. % of a carrier component comprising at least one organic carrier compound; and
 (viii) from about 5 wt. % to about 50 wt. % of an adjuvant component comprising at least one efficacy enhancer compound.

Embodiment 13. The insecticidal composition of Embodiment 12, comprising:
 (i) from about 25 wt. % to about 31 wt. % bifenthrin;
 (ii) from about 6 wt. % to about 8 wt. % chlorantraniliprole;
 (iii) from about 2 wt. % to about 5 wt. % of the dispersant component;
 (iv) from about 2 wt. % to about 6 wt. % of the emulsifier component;
 (v) from about 0.1 wt. % to about 1 wt. % of the rheology modifier component;
 (vi) from about 5 wt. % to about 25 wt. % of the solvent component;
 (vii) from about 15 wt. % to about 40 wt. % of the carrier component; and
 (viii) from about 10 wt. % to about 30 wt. % of the efficacy enhancer component.

Embodiment 14. The insecticidal composition of Embodiments 12 or 13, comprising:
 (i) about 28 wt. % bifenthrin, and
 (ii) about 7 wt. % chlorantraniliprole;
 (iii) about 3 wt. % of the dispersant component;
 (iv) about 4 wt. % of the emulsifier component;
 (v) about 0.5 wt. % of the rheology modifier component;
 (vi) about 12.9 wt. % of the solvent component;
 (vii) about 24.6 wt. % of the carrier component; and
 (viii) about 20 wt. % of the efficacy enhancer component.

Embodiment 15. The insecticidal composition of any one of Embodiments 12 to 14, wherein the efficacy enhancer comprises a phosphate ester of Formula I

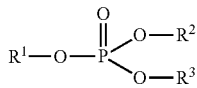

wherein
R¹ is a straight-chain or branched alkyl having from 4 to 12 carbon atoms, or a phenyl group optionally substituted with from 1 to 3 $C_1$-$C_4$ straight-chain or branched alkyl groups, and R² and R³ are each independently a straight-chain or branched alkyl having from 2 to 8 carbon atoms, or a phenyl group optionally substituted with from 1 to 3 $C_1$-$C_4$ straight-chain or branched alkyl groups.

Embodiment 16. The insecticidal composition of Embodiment 15, wherein the phosphate ester is selected from the group consisting of trixylenyl phosphate, butylatated phenol phosphate, tris(isopropylphenyl) phosphate, cresyl diphenyl phosphate, isopropylphehyl diphenyl phosphate, t-butylphenyl diphenyl phosphate, 2-ethylhexyl, diphenyl phosphate, isodecyl diphenyl phosphate, tri-n-butyl phosphate, tri-n-pentyl phosphate, tri-n-hexyl phosphate, tri-n-heptyl phosphate, tri-n-octyl phosphate, nonyl dioctyl phosphate, butyl dioctyl phosphate, dibutyl nonyl phosphate, butan-2-yl dibutyl phosphate, butan-2-yl diethyl phosphate, butan-2-yl bis(2-methylpropyl) phosphate, 3-methylbutyl dipropan-2-yl phosphate, tris-(2-ethylhexyl)phosphate, tri-iso-butyl phosphate, tributoxylethyl phosphate, and combinations thereof.

Embodiment 17. The insecticidal composition of 16, wherein the phosphate ester is selected from tris-(2-ethylhexyl)phosphate, tri-n-octyl phosphate, and tri-iso-butyl phosphate.

Embodiment 18. The insecticidal composition of Embodiment 17, wherein the phosphate ester is tris-(2-ethylhexyl) phosphate.

Embodiment 19. The insecticidal composition of any one of Embodiments 1 to 8, wherein the composition is a suspoemulsion, wherein the composition comprises:
(i) from about 20 wt. % to about 35 wt. % bifenthrin, and
(ii) from about 5 wt. % to about 9 wt. % chlorantraniliprole;
and wherein the composition further comprises
(iii) from about 1 wt. % to about 10 wt. % of a dispersant component comprising at least one dispersant compound;
(iv) from about 1 wt. % to about 10 wt. % of an emulsifier component comprising at least one emulsifier compound;
(v) from about 0.1 wt. % to about 5 wt. % of a rheology modifier component comprising at least one rheology modifier compound;
(vi) from about 5 wt. % to about 50 wt. % of a solvent component comprising at least one organic solvent compound;
(vii) from about 10 wt. % to about 60 wt. % of a carrier component comprising water; and
(viii) from about 5 wt. % to about 50 wt. % of an adjuvant component comprising at least one efficacy enhancer compound.

Embodiment 20. The insecticidal composition of Embodiment 19, comprising:
(i) from about 25 wt. % to about 31 wt. % bifenthrin;
(ii) from about 6 wt. % to about 8 wt. % chlorantraniliprole;
(iii) from about 1 wt. % to about 4 wt. % of the dispersant component;
(iv) from about 2 wt. % to about 6 wt. % of the emulsifier component;
(v) from about 0.1 wt. % to about 1 wt. % of the rheology modifier component; and
(vi) from about 20 wt. % to about 40 wt. % of the solvent component.

Embodiment 21. The insecticidal composition of Embodiment 20, comprising:
(i) about 28 wt. % bifenthrin, and
(ii) about 7 wt. % chlorantraniliprole;
(iii) about 2.3 wt. % of the dispersant component;
(iv) about 3.5 wt. % of the emulsifier component;
(v) about 0.4 wt. % of the rheology modifier component;
(vi) about 30 wt. % of the organic solvent component; and
(vii) about 24.4 wt. % of the carrier component.

Embodiment 22. The insecticidal composition of any one of Embodiments 19 to 21 further comprising:
(viii) from about 0.05 wt. % to about 1 wt. % of an antifoam component comprising at least one antifoam compound;
(ix) from about 0.01 wt. % to about 0.5 wt. % of a biocide component comprising at least one biocide compound; and
(x) from about 1 wt. % to about 10 wt. % of an antifreeze component comprising at least one antifreeze compound.

Embodiment 23. The insecticidal composition of any one of Embodiments 1 to 8, wherein the composition is a suspoemulsion, wherein the composition comprises:
(i) from about 20 wt. % to about 35 wt. % bifenthrin, and
(ii) from about 5 wt. % to about 9 wt. % chlorantraniliprole;
and wherein the composition further comprises
(iii) from about 1 wt. % to about 10 wt. % of a dispersant component comprising at least one dispersant compound;
(iv) from about 1 wt. % to about 10 wt. % of an emulsifier component comprising at least one emulsifier compound;
(v) from about 0.1 wt. % to about 5 wt. % of a rheology modifier component comprising at least one rheology modifier compound;
(vi) from about 5 wt. % to about 30 wt. % of an organic solvent component comprising at least one organic solvent compound;
(vii) from about 10 wt. % to about 60 wt. % of carrier component comprising water; and
(viii) from about 5 wt. % to about 50 wt. % of an adjuvant component comprising at least one efficacy enhancer compound.

Embodiment 24. The insecticidal composition of Embodiment 23, comprising:
(i) from about 25 wt. % to about 31 wt. % bifenthrin;
(ii) from about 6 wt. % to about 8 wt. % chlorantraniliprole;
(iii) from about 1 wt. % to about 4 wt. % of the dispersant component;
(iv) from about 2 wt. % to about 6 wt. % of the emulsifier component;
(v) from about 0.1 wt. % to about 1 wt. % of the rheology modifier component;
(vi) from about 5 wt. % to about 20 wt. % of the solvent component;
(vii) from about 15 wt. % to about 40 wt. % of the carrier component; and (viii) from about 10 wt. % to about 30 wt. % of the efficacy enhancer component.

Embodiment 25. The insecticidal composition of Embodiment 24 comprising:
(i) about 28 wt. % bifenthrin, and
(ii) about 7 wt. % chlorantraniliprole;
(iii) about 2.3 wt. % of the dispersant component;
(iv) about 3.5 wt. % of the emulsifier component;
(v) about 0.5 wt. % of the rheology modifier component;
(vi) about 11 wt. % of the organic solvent component;
(vii) about 24.4 wt. % of the carrier component; and
(viii) about 19 wt. % of the efficacy enhancer component.

Embodiment 26. The insecticidal composition of any one of Embodiments 23 to 25 further comprising:
(ix) from about 0.05 wt. % to about 1 wt. % of an antifoam component comprising at least one antifoam compound;
(x) from about 0.01 wt. % to about 0.5 wt. % of a biocide component comprising at least one biocide compound; and
(xi) from about 1 wt. % to about 10 wt. % of an antifreeze component comprising at least one antifreeze compound.

Embodiment 27. The insecticidal composition of any one of Embodiments 23 to 26, wherein the efficacy enhancer component comprises a phosphate ester of Formula I

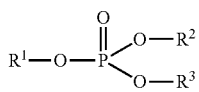

wherein
$R^1$ is a straight-chain or branched alkyl having from 4 to 12 carbon atoms, or a phenyl group optionally substituted with from 1 to 3 $C_1$-$C_4$ straight-chain or branched alkyl groups, and
$R^2$ and $R^3$ are each independently a straight-chain or branched alkyl having from 2 to 8 carbon atoms, or a phenyl group optionally substituted with from 1 to 3 $C_1$-$C_4$ straight-chain or branched alkyl groups.

Embodiment 28. The insecticidal composition of Embodiment 27, wherein the phosphate ester is selected from the group consisting of trixylenyl phosphate, butylatated phenol phosphate, tris(isopropylphenyl) phosphate, cresyl diphenyl phosphate, isopropylphehyl diphenyl phosphate, t-butylphenyl diphenyl phosphate, 2-ethylhexyl, diphenyl phosphate, isodecyl diphenyl phosphate, tri-n-butyl phosphate, tri-n-pentyl phosphate, tri-n-hexyl phosphate, tri-n-heptyl phosphate, tri-n-octyl phosphate, nonyl dioctyl phosphate, butyl dioctyl phosphate, dibutyl nonyl phosphate, butan-2-yl dibutyl phosphate, butan-2-yl diethyl phosphate, butan-2-yl bis(2-methylpropyl) phosphate, 3-methylbutyl dipropan-2-yl phosphate, tris-(2-ethylhexyl)phosphate, tri-iso-butyl phosphate, tributoxylethyl phosphate, and combinations thereof.

Embodiment 29. The insecticidal composition of 28, wherein the phosphate ester is selected from tris-(2-ethylhexyl)phosphate, tri-n-octyl phosphate, and tri-iso-butyl phosphate.

Embodiment 30. The insecticidal composition of Embodiment 29, wherein the phosphate ester is tris-(2-ethylhexyl) phosphate.

Embodiment 31. The insecticidal composition of any one of Embodiments 1 to 8, wherein the composition is a suspension concentrate, wherein the composition comprises:
(i) from about 20 wt. % to about 35 wt. % bifenthrin, and
(ii) from about 5 wt. % to about 9 wt. % chlorantraniliprole;
and wherein the composition further comprises
(iii) from about 1 wt. % to about 10 wt. % of a dispersant component comprising at least one dispersant compound;
(iv) from about 0.05 wt. % to about 5 wt. % of a rheology modifier component comprising at least one rheology modifier compound; and
(v) from about 20 wt. % to about 70 wt. % of a carrier component comprising water, at least organic solvent compound, or a combination thereof.

Embodiment 32. The insecticidal composition of Embodiment 31, comprising:
(i) from about 25 wt. % to about 31 wt. % bifenthrin;
(ii) from about 6 wt. % to about 8 wt. % chlorantraniliprole;
(iii) from about 2 wt. % to about 8 wt. % of the dispersant component;
(iv) from about 0.05 wt. % to about 0.5 wt. % of the rheology modifier component; and
(v) from about 40 wt. % to about 65 wt. % of the carrier component.

Embodiment 33. The insecticidal composition of Embodiment 32, comprising:
(i) about 28 wt. % bifenthrin, and
(ii) about 7 wt. % chlorantraniliprole;
(iii) about 5 wt. % of the dispersant component;
(iv) about 0.12 wt. % of the rheology modifier component; and
(v) about 53 wt. % of the carrier component.

Embodiment 34. The insecticidal composition of any one of Embodiments 31 to 33 further comprising:
(vi) from about 0.05 wt. % to about 1 wt. % of an antifoam component comprising at least one antifoam compound;
(vii) from about 0.01 wt. % to about 0.5 wt. % of a biocide component comprising at least one biocide compound; and
(viii) from about 2 wt. % to about 10 wt. % of an antifreeze component comprising at least one antifreeze compound.

Embodiment 35. The insecticidal composition of any one of Embodiments 1 to 5, wherein the composition is a concentrate comprising:
(i) from about 11 wt. % to about 20 wt. % bifenthrin, and
(ii) from about 5 wt. % to about 15 wt. % chlorantraniliprole;
and wherein the composition further comprises
(iii) from about 1 wt. % to about 10 wt. % of a dispersant component comprising at least one dispersant compound,
(iv) from about 1 wt. % to about 10 wt. % of a wetting agent component comprising at least one wetting agent compound,
(v) from about 1 wt. % to about 12 wt. % of a rheology modifier component comprising at least one rheology modifier compound, and
(vi) from about 20 wt. % to about 60 wt. % water.

Embodiment 36. The insecticidal composition of Embodiment 35, comprising:
(i) from about 12 wt. % to about 17 wt. % bifenthrin, and (ii) from about 7 wt. % to about 12 wt. % chlorantraniliprole;
(iii) from about 3 wt. % to about 7 wt. % of the dispersant component;
(iv) from about 4 wt. % to about 9 wt. % of the wetting agent component;
(v) from about 5 wt. % to about 10 wt. % of the rheology modifier component; and
(vi) from about 30 wt. % to about 60 wt. % of water.

Embodiment 37. The insecticidal composition of Embodiment 36, comprising:
(i) about 15 wt. % bifenthrin;
(ii) about 10 wt. % chlorantraniliprole;
(iii) about 5 wt. % of the dispersant component;
(iv) about 6 wt. % of the wetting agent component;
(v) about 7.5 wt. % of the rheology modifier component; and
(vi) about 49 wt. % of water.

Embodiment 38. A tank mix or premix composition comprising the insecticidal composition of any one of Embodiments 1 to 37 and a diluent, wherein each of the bifenthrin and the chlorantraniliprole concentration is less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %.

Embodiment 39. The tank mix or premix composition of Embodiment 38 wherein the diluent comprises water.

Embodiment 40. The tank mix or premix composition of Embodiment 38 or Embodiment 39 further comprising at least one adjuvant compound.

Embodiment 41. The tank mix or premix composition of Embodiment 40 wherein the at least one adjuvant is selected from at least one surfactant compound, at least one crop oil compound, and a combination thereof.

Embodiment 42. An insecticidal tank mix or premix composition comprising:
(i) bifenthrin;
(ii) chlorantraniliprole; and
(iii) a diluent component comprising an aromatic hydrocarbon solvent,
wherein the weight ratio of bifenthrin to chlorantraniliprole on an active ingredient basis is from about 10:1 to about 1:10.

Embodiment 43. The tank mix or premix composition of Embodiment 42, wherein each of the bifenthrin and the chlorantraniliprole concentration is less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %.

Embodiment 44. The tank mix or premix composition of Embodiment 42 or Embodiment 43, wherein the weight ratio of bifenthrin to chlorantraniliprole on an active ingredient basis from 1.5:1 to 10:1.

Embodiment 45. The tank mix or premix composition of Embodiment 44, wherein the weight ratio of bifenthrin to chlorantraniliprole on an active ingredient basis is from 1.5:1 to 5:1.

Embodiment 46. The tank mix or premix composition of Embodiment 44, wherein the weight ratio of bifenthrin to chlorantraniliprole on an active ingredient basis is from 3:1 to 5:1.

Embodiment 47. The tank mix or premix composition of Embodiment 46 wherein the weight ratio of bifenthrin to chlorantraniliprole on an active ingredient basis is about 4:1.

Embodiment 48. The tank mix or premix of any one of Embodiments 42 to 47, wherein the diluent component comprises water.

Embodiment 49. The tank mix or premix composition of any one of Embodiments 42 to 48, further comprising an adjuvant component comprising at least one adjuvant compound.

Embodiment 50. The tank mix or premix of Embodiment 48 or Embodiment 49, wherein the at least one adjuvant is selected from a phosphate ester enhancer, a surfactant component comprising at least one surfactant compound, a crop oil component comprising at least one crop oil compound, and a combination thereof.

Embodiment 51. An insecticidal composition comprising:
(i) bifenthrin and chlorantraniliprole, wherein the weight ratio of bifenthrin to chlorantraniliprole on an active ingredient basis is from about 10:1 to about 1:10; and
(ii) a phosphate ester of Formula I

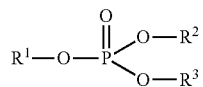

wherein
$R^1$ is a straight-chain or branched alkyl having from 4 to 12 carbon atoms, or a phenyl group optionally substituted with from 1 to 3 $C_1$-$C_4$ straight-chain or branched alkyl groups, and
$R^2$ and $R^3$ are each independently a straight-chain or branched alkyl having from 2 to 8 carbon atoms, or a phenyl group optionally substituted with from 1 to 3 $C_1$-$C_4$ straight-chain or branched alkyl groups.

Embodiment 52. The composition of Embodiment 51, wherein the phosphate ester is selected from the group consisting of trixylenyl phosphate, butylatated phenol phosphate, tris(isopropylphenyl) phosphate, cresyl diphenyl phosphate, isopropylphehyl diphenyl phosphate, t-butylphenyl diphenyl phosphate, 2-ethylhexyl, diphenyl phosphate, isodecyl diphenyl phosphate, tri-n-butyl phosphate, tri-n-pentyl phosphate, tri-n-hexyl phosphate, tri-n-heptyl phosphate, tri-n-octyl phosphate, nonyl dioctyl phosphate, butyl dioctyl phosphate, dibutyl nonyl phosphate, butan-2-yl dibutyl phosphate, butan-2-yl diethyl phosphate, butan-2-yl bis(2-methylpropyl) phosphate, 3-methylbutyl dipropan-2-yl phosphate, tris-(2-ethylhexyl)phosphate, tri-iso-butyl phosphate, tributoxylethyl phosphate, and combinations thereof.

Embodiment 53. The composition of 52, wherein the phosphate ester is selected from tris-(2-ethylhexyl)phosphate, tri-n-octyl phosphate, and tri-iso-butyl phosphate.

Embodiment 54. The composition of Embodiment 53, wherein the phosphate ester is tris-(2-ethylhexyl)phosphate.

Embodiment 55. The composition of any one of Embodiments 51 to 53 further comprising an aromatic hydrocarbon solvent.

Embodiment 56. The composition of any one of Embodiments 51 to 55, wherein the ratio of bifenthrin to chlorantraniliprole on an active ingredient basis is from about 5:1 to about 1:1.

Embodiment 57. The composition of Embodiment 56, wherein the ratio of bifenthrin to chlorantraniliprole on an active ingredient basis is about 4:1 or about 1.5:1.

Embodiment 58. The composition of any one of Embodiments 51 to 57, wherein:

(i) the composition is a tank mix or premix composition;
(ii) each of the bifenthrin and the chlorantraniliprole concentration is less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %; and
(iii) the composition further comprising an agriculturally acceptable diluent component comprising at least one diluent compound.

Embodiment 59. The composition of Embodiment 58, further comprising at least one adjuvant compound.

Embodiment 60. The composition of Embodiment 59 wherein the at least one adjuvant is selected from at least one surfactant compound, at least one crop oil compound, and a combination thereof.

Embodiment 61. The composition of any one of Embodiments 51 to 57, wherein the composition is a concentrate.

Embodiment 62. The composition of Embodiment 61, wherein the composition is selected from an oil dispersable composition, a suspension concentrate composition, and a suspoemulsion composition.

Embodiment 63. The composition of Embodiment 61 or Embodiment 62, wherein the bifenthrin concentration is from about 10 wt. % to about 60 wt. % and wherein the chlorantraniliprole concentration is from about 2 wt. % to about 13 wt. %.

Embodiment 64. The composition of Embodiment 63, wherein the bifenthrin concentration is from about 20 wt. % to about 40 wt. % and wherein the chlorantraniliprole concentration is from about 5 wt. % to about 10 wt. %.

Embodiment 65. The composition of any one of Embodiments 61 to 64 further comprising at least one of:
(i) a dispersant component comprising at least one dispersant compound;
(ii) an emulsifier component comprising at least one emulsifier compound;
(iii) a rheology modifier component comprising at least one rheology modifier compound;
(iv) a solvent component comprising at least one solvent compound;
(v) an adjuvant component comprising at least one efficacy enhancer compound;
(vi) an antifoam component comprising at least one antifoam compound;
(vi) a biocide component comprising at least one biocide compound;
(vii) an antifreeze component comprising at least one antifreeze compound; and
(viii) combinations thereof.

Embodiment 66. A method for controlling insect pests on plants, the method comprising applying the composition of any one of Embodiments 38 to 50 or 58 to 60 to a plurality of the plants.

Embodiment 67. The method of Embodiment 66, wherein the mortality of a plurality of the insect pests is at least 75% evaluated at three days after exposure to the active ingredient.

Embodiment 68. The method of Embodiment 66 or Embodiment 67, wherein the plant is a food crop, a turf grass, or an ornamental.

Embodiment 69. The method of any one of Embodiments 66 to 69, wherein the plurality of plants are infested with the phytophagous pests prior to application of the insecticide.

Embodiment 70. The method of any one of Embodiments 66 to 69, wherein the plurality of plants are not infested with the phytophagous pests prior to application of the insecticide.

Embodiment 71. The method of any one of Embodiments 66 to 70, wherein the composition is a premix.

Embodiment 72. The method of any one of Embodiments 66 to 70, wherein the crop is field corn, popcorn, or seed corn, and wherein the insect pest is selected from: Grasshoppers; Aphids; corn leaf beetle; Cereal leaf beetle; Chinch bug; Corn rootworm adults; Cucumber beetle adult; Cutworm species; Flea beetle; Greenbug; Japanese beetle adult; Sap beetle; Southern corn leaf; beetle; Stinkbugs; Tarnished plant bug; Western bean cutworm; Army cutworm; Corn earworm; Common stalk borer; Beet armyworm; European corn borer; Fall armyworm; Southern armyworm; Southwestern corn borer; Sugarcane borer adults; True armyworm or Armyworm species; Webworms; Yellowstriped armyworm; Banks grass mite; Brown marmorated stink bug; Carmine mite; and Twospotted spider mite.

Embodiment 73. The method of any one of Embodiments 66 to 70, wherein the crop is cotton, and wherein the plant pest is selected from: Boll weevil; Cotton aphid; Cotton fleahopper; Cotton leafperforator; Cutworm species; Grasshoppers; Plant bugs; Southern garden leafhopper; Banded soybean *thrips*; Stink bugs; Tobacco *thrips*; Beet armyworm; Cabbage looper; Cotton bollworm; Fall armyworm; Pink bollworm; Saltmarsh caterpillar; Southern armyworm; Soybean looper; Tobacco budworm; Western yellowstriped armyworm; *Lygus* spices; Carmine spider mite; Twospotted spider mite; and Whitefly.

Embodiment 74. The method of any one of Embodiments 66 to 70, wherein the crop is sweet corn, and wherein the insect pest is selected from: Cereal leaf; beetle Cutworm species; Chinch bug; Corn rootworm adults; Cucumber beetle adult; Flea beetle; Greenbug; Grasshoppers; Japanese beetle adult; Sap beetle; Southern corn leaf beetle; Stinkbugs; Tarnished plant bug; Western bean cutworm; Army cutworm; Common stalk borer; Corn earworm; Beet armyworm; European corn borer; Fall armyworm; Southern armyworm; Southwestern corn borer; True armyworm or Armyworm species; Webworms; and Yellowstriped armyworm.

Embodiment 75. The method of any one of Embodiments 66 to 70, wherein the crop is peanuts, and wherein the plant pest is selected from: Cutworm species; Green cloverworm; Grasshoppers; Leafhoppers; Southern corn rootworm; Stink bugs; Rednecked peanut worm; Threecornered alfalfa hopper; Velvetbean caterpillar; Cabbage looper; Corn earworm; Beet armyworm; Fall armyworm; Granulate cutworm; Lesser cornstalk borer; Soybean looper; Southern armyworm; Tobacco budworm; Yellowstriped armyworm; Aphids; Spider mites; *Thrips*; and Whitefly.

Embodiment 76. The method of any one of Embodiments 66 to 70,
wherein
(i) the crop is selected from: Pea (*Pisum* spp.): Dwarf pea; Edible-pod pea; English pea; Garden pea; Snow pea; Sugar snap pea; Pigeon pea; Bean (*phaseolus* spp,); Broadbean succulent); Lima bean (green); Runner Bean; Snap bean; Wax bean (*Vigna* spp.); Asparagus bean; Blackeyed pea; Chinese longbean; Cowpea; Moth bean; Southern pea; Yardlong bean; Jackbean; Soybean (immature seed); and Sword Bean, and
wherein
(ii) the plant pest is selected from: Cutworms; Cloverworm; Grasshoppers; Flea beetle; Aster; Leafhopper; Leafhoppers; Alfalfa caterpillar; Corn earworm; Beet armyworm; European corn borer; Fall armyworm; Cabbage looper; Soybean looper; Southern armyworm; Yellowstriped armyworm; Webworms; Western bean cutworm; Aphids; Bean leaf beetle; Cucumber beetles; Japanese beetle; Adult sap beetle; Stink bugs; Corn rootworm adult; *Thrips*; Pea weevil; Pea leaf weevil; Plant bugs; Banks grass mite; Twospotted spider mite; Carmine mite; *Lygus* species; Leafminers; and Silverleaf whitefly.

Embodiment 77. The method of any one of Embodiments 66 to 70,
wherein
(i) the crop is a dry cultivar selected from: Bean (*Lupinus*); Bean (*Phaseolus*); Field bean; Kidney bean; Lima bean (dry); Navy bean; Pinto bean; Tepary bean; Bean (*Vigna*); Adzuki bean; Blackeyed pea; Catjang; Cowpea; Crowder pea; Moth bean; Mung bean; Rice bean; Southern pea; Urd bean; Broad bean (dry); Chickpea; Guar; Lablab bean; Lentil, Pea (Piscum); Field pea; and Pigeon pea, and
wherein
(ii) the plant pest is selected from: Cutworms; Cloverworm; Grasshoppers; Flea beetle; Aster leafhopper; Leafhoppers; Alfalfa caterpillar; Corn earworm; Beet armyworm; European corn borer; Fall armyworm; Cabbage looper; Soybean looper; Southern armyworm; Yellowstriped armyworm; Webworms; Western bean cutworm; Aphids; Bean leaf beetle; Cucumber beetles; Japanese beetle; Sap beetle adult; Stink bugs; Corn rootworm; adult *Thrips*; Pea weevil; Pea leaf weevil; Plant bugs; Banks grass mite; Twospotted spider mite; Carmine mite; *Lygus* species; Leafminers; and Silverleaf whitefly.

Embodiment 78. The method of any one of Embodiments 66 to 70, wherein the crop is a dry cultivar,
wherein
(i) the crop is a root, tuber or vegetable selected from: Burdock, edible; Carrot; Celeriac; Chervil; turnip rooted; Chicory; *Ginseng*; Garden beets; Horseradish; Parsley; turnip rooted Parsnip; Radish; Radish, oriental; Rutabaga; Salsify; Salsify, black; Salsify, Spanish; Skirret, Turnip; Sweet potato; Arracacha; Arrowroot; Chinese artichoke; Jerusalem artichoke; Edible *canna*; Cassava (bitter and sweet); Chayote (root); Chufa; Dasheen (taro); Ginger; Leren; Tanier; Turmeric; Yam bean; and True yam, and
wherein
(ii) the plant pest is selected from: Beet armyworm; Western yellowstriped armyworm; Corn earworm; Cross-striped cabbageworm; Cutworms; Diamondback moth; European corn borer; Fall armyworm; Green cloverworm; Hornworms; Imported cabbageworm; Loopers; Southern armyworm; Tobacco budworm; Velvetbean caterpillar; Flea beetles; Click beetles; Cucumber beetles; White fringed beetles; May/June beetles; Sugarcane beetles; Aphids; Celery leaftier; Fire Ants; Flea Beetles; Spider mites; Silverleaf; and whitefly.

Embodiment 79. The method of any one of Embodiments 66 to 70, wherein the crop is potatoes, and wherein the plant pest is selected from: Grasshoppers; Beet and yellowstriped armyworms; Cabbage looper; Colorado potato beetle; European corn borer; Potato tuberworm; Flea beetles; Click beetles; Cucumber beetles; White fringed beetles; and May/June beetles.

Embodiment 80. The method of any one of Embodiments 66 to 70, wherein the crop is soybeans, and wherein the plant pest is selected from: Aphids; Bean leaf beetle; Blister beetle spp.; Cabbage looper; Corn earworm; Corn rootworm adult; Cowpea curculio; Cucumber beetle adult; Cutworms; False chinch bug; Flea beetle; Grasshoppers; Green cloverworm; Green stinkbug; Southern green stinkbug; Japanese beetle adult; Leaf skeletonizer species; Leafhoppers; Mexican bean beetle; Painted lady (thistle); caterpillar; Pea leaf weevil; Saltmarsh; caterpillar; Seedcorn maggot adult; Spittlebug; Stink Bug; Three-Cornered alfalfa Hopper; *Thrips*; Velvetbean caterpillar; Woollybear caterpillar; Alfalfa caterpillar; Armyworms; Beet armyworm; Fall armyworm; Dectes stem borer; European corn borer; Lesser cornstalk borer; Silverspotted skipper; Southern armyworm; Soybean looper; Tobacco budworm; Webworm; *Lygus* species; Brown marmorated stink bug; Redbanded stink bug; Whitefly; and Two spotted spider mites.

Embodiment 81. The method of any one of Embodiments 66 to 70, wherein the crop is tobacco, and wherein the plant pest is selected from: Aphid spp.; Cutworm species; Flea beetle (adults); Chinch bugs; Stink bugs; Japanese beetles; Grasshoppers; Green bugs; *Thrips*; Cucumber beetle; Armyworm species; Saltmarsh caterpillar; Split worm; (potato tuberworm); Tobacco budworm; Tomato hornworm; Tobacco hornworm; Spider mites; *Lygus* species; and Whiteflies.

Embodiment 82. The method of any one of Embodiments 66 to 70, wherein the crop is pecan trees, and wherein the plant pest is selected from: Black pecan aphid; Leaffooted bugs; Pecan *phylloxera*; Plant bugs; Stink bugs; Yellow pecan aphid; Hickory shuckworm; Pecan nut casebearer; Pecan leaf; casebearer; fire ants; Pecan weevil; and Spider mite species.

Embodiment 83. A method for controlling insect pests on plants, the method comprising applying the composition of any one of Embodiments 51 to 57 to a plurality of the plants.

EXAMPLES

Formulation ingredients used in the compositions provided in the examples are indicated in Table G below.

TABLE G

| Formulation Ingredients | Category | Description |
|---|---|---|
| Acticide ® LA 1209 | Biocide | Mixture of Bronopol, 5-Chloro-2-methyl-2H-isothiazol-3-one and 2-Methyl-2H-isothiazol-3-one (CAS# 52-51-7 and 55965-84-9) |
| Acticide ® SPX | Biocide | Reaction mass of: 5-chloro-2-methyl-4-iso-thiazolin-3-one and 2-methyl-2H-isothiazol-3-one (CAS# 55965-84-9) |
| Agnique ® PG 9116 | Wetting Agent | D-Glucopyranose, oligomeric, $C_9$-$C_{11}$ alkyl glycosides (CAS# 132778-08-6) |
| Ammonium Sulfate | pH Adjuster | CAS# 7783-20-2 |
| Atlox ® 4913 | Dispersant | Methyl methacrylate ethoxylated graft copolymer (CAS# 119724-54-8) |
| Atlox ® 4915 | Dispersant | Amphoteric polymeric dispersant (proprietary) |
| Bentone ® SD02 | Rheology Modifier | Bentonite Clay (CAS# 14808-60-7) |
| Besiege ® | Insecticide | Lambda-cyhalothrin (4.63%), chlorantraniliprole (9.26%) and other ingredients (86.11%) |
| Capture ® | Insecticide | 25.1 wt. % bifenthrin and 74.9% other ingredients |
| Brigade ® | Insecticide | Bifenthrin (25.1%) and other ingredients (74.9%) including xylene range aromatic solvents |
| Dextrol ™ OC-180 | Dispersant | Poly(oxy-1,2-ethanediyl), alpha-tridecyl-omega-hydroxy-phosphate, potassium salt (CAS# 68186-36-7) |

TABLE G-continued

| Formulation Ingredients | Category | Description |
|---|---|---|
| Disflamoll ® TOF | Adjuvant | Tris-(2-ethylhexyl)phosphate (CAS# 78-42-2) |
| Dyne-Amic ® | Adjuvant | Blend of refined methylated seed oils and organosilicone-based nonionic surfactants |
| Glycerol | Antifreeze | CAS# 56-81-5 |
| Hero ® | Insecticide | Zeta-cypermethrin (3.75%), bifethrin (11.25%), and other ingredients including petroleum distillates (85%) |
| Intrepid Edge ® | Insecticide | Methoxyfenozide (28.3%), Spinetoram (5.66%), propylene glycol (7%), other (59.04%) |
| Kathon ™ CG/ICP | Biocide | 5-Chloro-2-methyl-4-isothiazolin-3-one (1.25%) and 2-Methyl-4-isothiazolin-3-one (0.45%) in water |
| Kelzan ® S Plus | Thickener | Xanthan gum (CAS# 11138-66-2) |
| Morwet ® D400 | Dispersant | AquilNaftalen sodium sulfonate, formaldehyde condensed (CAS# 68425-94-5) |
| Mustang Maxx ® | Insecticide | Zeta-cypermethrin (9.15%), naphtha (50-60%), 1-methylnaphthalene (5-10%), naphthalene (5-10%), 2-methylnaphthalene (<15%), and acetophenone (10-20%) |
| Ninate ® 60E | Emulsifier | Dodecylbenzenesulfonic acid in 2-ethyl hexanol (CAS# 26264-06-02 and 104-76-7) |
| Nipacid BIT 40 | Preservative | 1,2-benzisothiazolinone (20% aqueous dispersion) |
| Orthene ® | Insecticide | Acephate |
| Polyfon ® H | Dispersant | Lignosulfonic acid, sodium salt (CAS# 8061-51-6) |
| Prevathon ® | Insecticide | 5 wt. % chlorantraniliprole and 95% other ingredients |
| Propylene glycol | Antifreeze | CAS# 57-55-6 |
| Proxel ® GXL | Biocide | 20% aqueous dipropylene glycol solution of 1,2-benzisothiazolin-3-one |
| Silfoam ® | Antifoam | Polydimethylsiloxane (CAS# 9005-00-9) |
| SRE | | |
| Solvesso ® 200 ND | Solvent | Naphtha (petroleum) heavy aromatic solvent consisting primarily of aromatic hydrocarbons having carbon numbers in the range of $C_9$-$C_{16}$ (CAS# 64742-94-5) |
| Surfom ® EMS 2000 | Carrier | Soy methyl ester (CAS# 67784-80-9) |
| Surfom ® R400 | Emulsifier | Ethoxylated castor oil (CAS# 61791-12-6) |
| Ultraric ® 5000 | Dispersant | EO/PO butyl alcohol (CAS# 9038-95-3) |
| Veegum ® R | Rheology Modifier | Smectite clay (CAS# 12199-37-0) |
| Goma xantana | Rheology Modifier | Xanthan gum (CAS# 11138-66-2) |
| Xiameter ® AFE-0100 | Antifoam | Polydimethylsiloxanes (CAS# 63148-62-9) |

Example 1

The SC compositions in Table 1 were prepared in an agitated vessel or tank. Inert ingredients such as Dextrol™ OC 180, Agnique® PG9116, Synergen W06, Xiameter® AFB-0100 were dissolved in water, to which technical bifenthrin and chlorantraniliprole were mixed, and the slurry was wet milled to particle size d50 less than 10 μm. The millbase was further formulated by adding anti-freeze such as glycerin and ammonium sulfate, xanthan gum and biocide. In Table 1, "Form" refers to the formulation number, % refers to wt. %, and the weight ratio of bifenthrin to chlorantraniliprole is reported on a weigh active ingredient basis. The compositions at concentrations of 20 ppm, 342 ppm and 500 ppm were evaluated for suspendability at 54° C. at times 0, 2 weeks and 3 weeks by CIPAC method MT 161. The particle size was evaluated by wet sieve (200 mesh) at 54° C. at times 0 and 2 weeks by CIPAC method MT 185.

TABLE 1

| Ingredients | Form. 1.1 | Form. 1.2 | Form. 1.3 | Form. 1.4 | Form. 1.5 | Form. 1.6 | Form. 1.7 |
|---|---|---|---|---|---|---|---|
| Bifenthrin technical | 16.6% | 16.2% | 14.6% | 16.3% | 14.4% | 16.3% | 16.3% |
| Chlorantraniliprole | 8.3% | 8.1% | 9.8% | 8.2% | 9.6% | 8.2% | 8.2% |
| Bifen:Chloran ratio | 2:1 | 2:1 | 1.5:1 | 2:1 | 1.5:1 | 2:1 | 2:1 |
| Dextrol ™ OC-180 | 2.2% | 2.2% | 2.0% | 2.2% | 2.0% | 2.2% | 2.0% |
| Atlox ® 4913 | 3.3% | 3.2% | 3.0% | 3.3% | 3.0% | 3.1% | 1.5% |
| Agnique ® PG9116 | 6.6% | 6.5% | 6.1% | 6.0% | 6.0% | 6.0% | 3.0% |
| Synergen W06 | 0.0% | 0.0% | 0.0% | 0.0% | 0.0% | 2.4% | 2.4% |
| Xiameter ® AFE-0100 | 0.1% | 0.1% | 0.17% | 0.1% | 0.22% | 0.1% | 0.1% |
| Kelzan ® S + 2% | 6.2% | 8.2% | 7.4% | 8.2% | 0.16% | 8.2% | 10.0% |
| Acticide ® LA 1209 | 0.1% | 0.1% | 0.1% | 0.1% | 0.1% | 0.1% | 0.1% |
| Glycerin | 4.4% | 4.3% | 5.0% | 5.0% | 5.0% | 5.0% | 5.0% |
| Ammonium sulfate | 3.1% | 3.0% | 3.1% | 3.0% | 3.0% | 3.0% | 3.4% |
| Water | 48.9% | 47.9% | 48.8% | 47.6% | 56.53% | 45.4% | 48.0% |
| Suspensibility (20 ppm) | | | | | | | |
| Initial | — | — | 98% | 96% | — | 93% | 92% |
| 2 weeks at 54° C. | — | — | — | 95% | — | — | 92% |
| 3 weeks at 54° C. | — | — | 94% | 95% | — | 96% | — |
| Suspensibility (342 ppm) | | | | | | | |
| Initial | 69% | 97% | 91% | 92% | — | 91% | 92% |
| 2 weeks at 54° C. | — | 99% | — | 94% | — | — | 93% |
| 3 weeks at 54° C. | — | — | 91% | 94% | — | 89% | — |

TABLE 1-continued

| Ingredients | Form. 1.1 | Form. 1.2 | Form. 1.3 | Form. 1.4 | Form. 1.5 | Form. 1.6 | Form. 1.7 |
|---|---|---|---|---|---|---|---|
| Suspensibility (500 ppm) | | | | | | | |
| Initial | — | — | 90% | 90% | — | 98% | 91% |
| 2 weeks at 54° C. | — | — | — | 91% | — | — | 89% |
| 3 weeks at 54° C. | — | — | 91% | 91% | — | 82% | — |
| Suspensibility (1000 ppm) Initial | — | — | 90% | — | — | 90% | — |
| Wet sieve 200 mesh Initial | ~0% | ~0% | ~0% | ~0% | — | ~0% | ~0% |
| Wet sieve 200 mesh 2 week at 54° C. | ~0% | ~0% | ~0% | ~0% | — | ~0% | ~0% |

The results indicate that the formulations have a wide range of electrolyte compatibility and high temperature storage stability as evidenced by the suspensibility tests at 20, 342 and 500 ppm water hardness at 54° C. for 2 weeks or 3 weeks. It is believed that the formulations will tolerate 1000 ppm hard water.

Example 2

Example 2A

The efficacy (potency) of Example 1 Formulation 1.3 as a premix was evaluated versus tank mixes of chlorantraniliprole and bifenthrin. Cotton plants were grown in a growth chamber until the appropriate size was reached. Formulations were applied with the active ingredient diluted in water to the desired test concentration. Bifenthrin and chlorantraniliprole for the premix and tank mix formulations were applied at the same rate and ratio to allow for direct comparison. After plants dried, leaf material was collected for bioassaying. Leaf pieces were infested with beet armyworm larvae Spodoptera exigua and larval mortality was determined 96 hours after infestation. The results are reported in Table 2A below. The results show that a premix provided better efficacy than a tank-mix in the lab evaluation.

TABLE 2A

| Formulation | Mortality (%) |
|---|---|
| Formulation 1.3 (premix) applied at 5 ppm | 91 |
| Formulation 1.3 (premix) applied at 0.5 ppm | 31 |
| Tank mix of containing 3 ppm bifenthrin (Capture ®) and 2 ppm chlorantraniliprole (Prevathon ®) | 81 |
| Tank mix of containing 0.33 ppm bifenthrin (Capture) and 0.22 ppm chlorantraniliprole (Prevathon ®) | 13 |

Example 2B

The efficacy (potency) of Example 1 Formulation 1.3 as a premix was evaluated versus tank mixes of chlorantraniliprole and bifenthrin. Cotton plants were grown in the field to the appropriate size and sprayed with test materials diluted in water at the desired concentrations. Bifenthrin and chlorantraniliprole for the premix and tank mix formulations were applied at the same rate and ratio to allow for direct comparison. Treated leaves were collected for bioassaying at 7 DAT. Leaf pieces were infested with beet armyworm larvae Spodoptera exigua and larval mortality was determined 96 hours after infestation. The results in Table 2B show that a premix provided better efficacy than a tank-mix in the filed evaluation.

TABLE 2B

| Formulation | Mortality (%) Field Test |
|---|---|
| Formulation 1.3 (premix) applied at 62.5 grams per hectare | 100 |
| Formulation 1.3 (premix) applied at 125 grams per hectare | 100 |
| Tank mix of where 37.5 grams per hectare bifenthrin (Capture) and 25 grams per hectare chlorantraniliprole (Prevathon ®) were applied | 97.9 |
| Tank mix of where 75 grams per hectare bifenthrin (Capture) and 50 grams per hectare chlorantraniliprole (Prevathon ®) were applied | 97.9 |
| Untreated | 0 |

Example 2C

Example 1 Formulation 1.3 was evaluated as a foliar application for control of stinkbugs in soybeans and for determination of crop safety. The field trial was conducted on soybeans in Alexandria, LA (USA). The trial was set up as a randomized complete block experimental design utilizing 4 replications. The plots were 50 ft long by 12.57 ft wide. One application was made on Aug. 5, 2019 using a spray volume of 10 gallons per acre. Stink bug control was evaluated on August 9, 12, 16 and 19 using a sweep net, a total of 25 sweeps per plot were made, and stink bug species and stage were separated and counted. The pooled mean across all evaluation dates for adult plus nymph stink bugs per treatment are presented in Table 2C (control of brown stink bugs), Table 2D (control of Redbanded stink bugs), and 2E below (control of Southern green stink bugs).

TABLE 2C (Control of brown stink bugs in soybean)

| Treatment/Rate | Type | Mean Number stink Bugs/ 25 sweeps | Control (%) |
|---|---|---|---|
| Formulation 1.3 (0.117 lb a.i./acre) | Premix | 0.63 | 65 |
| Formulation 1.3 (0.167 lb a.i./acre) | Premix | 0.38 | 79 |
| Formulation 1.3 (0.117 lb a.i./acre) + Orthene ® (0.75/b/acre) | | 0.25 | 86 |
| Formulation 1.3 (0.117 lb a.i./ acre) + Dyne-Amic ® (0.25% v/v) | | 0.69 | 62 |

TABLE 2C-continued (Control of brown stink bugs in soybean)

| Treatment/Rate | Type | Mean Number stink Bugs/ 25 sweeps | Control (%) |
|---|---|---|---|
| Brigade ® (0.1 lb a.i./acre) + Prevathon ® (0.067 lb a.i./acre) | Tank mix | 0.44 | 76 |
| Brigade ® (0.1 lb a.i./acre) | | 0.63 | 65 |
| Besiege ® (0.083 lb a.i./acre) | | 1.25 | 31 |
| Untreated | | 1.81 | — |

TABLE 2D (Control of Redbanded stink bugs in soybean)

| Treatment/Rate | Type | Mean Number stink Bugs/ 25 sweeps | Control (%) |
|---|---|---|---|
| Formulation 1.3 (0.117 lb a.i./acre) | Premix | 5.56 | 43 |
| Formulation 1.3 (0.167 lb a.i./acre) | Premix | 4.5 | 54 |
| Formulation 1.3 (0.117 lb a.i./acre) + Orthene ® (0.75 /b/acre) | | 2 | 79 |
| Formulation 1.3 (0.117 lb a.i./acre) + Dyne-Amic ® (0.25% v/v) | | 7.94 | 18 |
| Brigade ® (0.1 lb a.i./acre) + Prevathon ® (0.067 lb a.i./acre) | Tank mix | 4.31 | 56 |
| Brigade ® (0.1 lb a.i./acre) | | 5.81 | 40 |
| Besiege ® (0.083 lb a.i./acre) | | 5.5 | 44 |
| Untreated | | 9.75 | — |

TABLE 2E (Control of Southern green stink bugs in soybean)

| Treatment/Rate | Type | Mean Number stink Bugs/ 25 sweeps | Control (%) |
|---|---|---|---|
| Formulation 1.3 (0.117 lb a.i./acre) | Premix | 1.75 | 78 |
| Formulation 1.3 (0.167 lb a.i./acre) | Premix | 0.44 | 94 |
| Formulation 1.3 (0.117 lb a.i./acre) + Orthene ® (0.75/b/acre) | | 0.31 | 96 |
| Formulation 1.3 (0.117 lb a.i./acre) + Dyne-Amic ® (0.25% v/v) | | 2.25 | 71 |
| Brigade ® (0.1 lb a.i./acre) + Prevathon ® (0.067 lb a.i./acre) | Tank mix | 1 | 87 |
| Brigade ® (0.1 lb a.i./acre) | | 0.38 | 95 |
| Besiege ® (0.083 lb a.i./acre) | | 0.19 | 97 |
| Untreated | | 7.81 | — |

The data in Tables 2C to 2E show that Formulation 1.3 provides a higher control rate than Besiege® on redbanded and brown stink bugs, where premix and tank mixes were similar.

The data in Tables 2C to 2E further show that Formulation 1.3 provides a similar control rate as Besiege® on southern stink bugs, but better than a tank mix of bifenthrin and chlorantraniliprole at the same rates, thereby indicating the superiority of the premix formulation on this pest.

Example 2D

Example 1 Formulation 1.3 was evaluated as a foliar application for control of stinkbugs in soybeans and for determination of crop safety. The field trial was conducted on soybeans in Stoneville, MS (USA). The trial was set up as a randomized complete block experimental design utilizing 4 replications. Plots were 30 ft long by 13.33 ft wide. One application was made on Aug. 27, 2019 using a spray volume of 10 gallons per acre. Number of soybean looper larvae was evaluated on September 2 and 9 using a sweep net, and a total of 25 sweeps per plot were taken. Percent defoliation by larval feeding was also evaluated on September 2. The pooled mean of soybean looper larvae, % control and % defoliation across all evaluation dates are presented in the Table 2F where "Loopers" refers to the mean number of soybean looper larvae/25 sweeps.

TABLE 2F (Control of soybean looper in soybean)

| Treatment/Rate | Type | Loopers | Control (%) | Defoliation (%) |
|---|---|---|---|---|
| Formulation 1.3 (0.097 lb a.i./acre) | Premix | 4 | 62 | 8.75 |
| Formulation 1.3 (0.117 lb a.i./acre) | Premix | 2.88 | 73 | 7.5 |
| Formulation 1.3 (0.167 lb a.i./acre) | Premix | 2.88 | 73 | 8.25 |
| Formulation 1.3 (0.117 lb a.i./acre) + Adjuvant | | 3.13 | 70 | 7.5 |
| Brigade ® (0.1 lb a.i./acre) + Prevathon ® (0.067 lb a.i./acre) | Tank mix | 2 | 81 | 8.75 |
| Prevathon ® (0.067 lb a.i./acre) | | 2.75 | 74 | 7 |
| Besiege ® (0.104 lb a.i./acre) | | 3.75 | 65 | 9 |
| Intrepid Edge ® (0.118 lb a.i./acre) | | 3.13 | 70 | 7.5 |
| Intrepid Edge ® (0.15 lb a.i./acre) | | 1.25 | 88 | 6 |
| Untreated | | 10.63 | — | 24.5 |

The data show that Formulation 1.3 is similar to a tank mix of bifenthrin and chlorantraniliprole or Prevathon® alone at the same application rates.

The data further show that Formulation 1.3 is equal or slightly weaker than standard Intrepid Edge®.

The data further show that Formulation 1.3 is slightly better than Besiege®, including superiority of bifenthrin as pyrethroid ion in the premix.

Example 2E

Example 1 Formulation 1.3 was evaluated as a foliar application for control of corn earworm and corn silk fly in sweet corn, and for determination of crop safety. The field trial was conducted on sweet corn in Quitman, GA (USA). The trial was set up as a randomized complete block experimental design utilizing 4 replications. Plots were 30 ft long by 9 ft wide. Four applications were made on Jun. 5, 11, 19 and 27, 2019, using a spray volume of 20 gallons per acre. On July 1, 25 corn ears per plot were sampled for damage and the number of corn earworms per ear were also counted. The mean number of corn earworm larvae and % ear damage are presented in Table 2G where "Earworm" refers to the mean number of corn earworm larvae per 25 ears, "Control (%)" means percent corn earworm control, and "Dam. Ears" refers to % corn earworm damaged ears per 25 ears.

TABLE 2G (Control of corn earworm in sweet corn)

| Treatment/Rate | Type | Earworm | Control (%) | Dam. Ears (%) |
|---|---|---|---|---|
| Formulation 1.3 (0.097 lb a.i./acre) | Premix | 81.25 | 80 | 28 |
| Formulation 1.3 (0.117 lb a.i./acre) | Premix | 62.5 | 85 | 30 |
| Formulation 1.3 (0.167 lb a.i./acre) | Premix | 18.75 | 95 | 22 |
| Formulation 1.3 (0.117 lb a.i./acre) + Dyne-Amic ® (0.25%) | Tank mix | 31.25 | 92 | 22 |
| Brigade ® (0.1 lb a.i./acre) + Prevathon ® (0.067 lb a.i./acre) | Tank mix | 93.75 | 77 | 29 |
| Prevathon ® (0.067 lb a.i./acre) | | 62.5 | 85 | 31 |
| Besiege ® (0.104 lb a.i./acre) | | 131.25 | 68 | 41 |
| Mustang Maxx ® (0.025 lb a.i./acre) | | 187.5 | 55 | 44 |
| Untreated | | 412.5 | — | 82 |

The data show that Formulation 1.3 was better than all of the standard formulations, including Prevathon® at the highest rate (same chlorantraniliprole rate as in the premix), indicating superiority of the premix formulation over the tank mix.

The data further show that Formulation 1.3 is superior to Besiege®, indicating superiority of bifenthrin as pyrethroid ion in the mix.

Example 2F

Example 1 Formulation 1.3 was evaluated as a foliar application for control of fall armyworm in sweet corn, and for determination of crop safety. The field trial was conducted on sweet corn in Sparks, GA (USA). The trial was set up as a randomized complete block experimental design utilizing 4 replications. Plots were 25 ft long by 3 ft wide. One application was made on Aug. 9, 2019, using a spray volume of 20 gallons per acre. Plant damage by fall armyworm was evaluated as a % in 25 ft of row on Aug. 15, 23 and 30, 2019. The pooled mean % plant damage across the three evaluation dates is presented in the Table 2H where "Plant Damage (%)" refers to the mean pooled percent plant damage by fall armyworm in 25 foot rows.

TABLE 2H

| Treatment/Rate | Type | Plant Damage (%) |
|---|---|---|
| Formulation 1.3 (0.097 lb a.i./acre) | Premix | 11.2 |
| Formulation 1.3 (0.117 lb a.i./acre) | Premix | 5.7 |
| Formulation 1.3 (0.167 lb a.i./acre) | Premix | 4 |
| Formulation 1.3 (0.117 lb a.i./acre) + Dyne-Amic ® (0.25%) | Tank mix | 5.2 |
| Brigade ® (0.1 lb a.i./acre) + Prevathon ® (0.067 lb a.i./acre) | Tank mix | 5.5 |
| Prevathon ® (0.067 lb a.i./acre) | | 7.7 |
| Besiege ® (0.104 lb a.i./acre) | | 9.3 |
| Hero ® (0.1 lb a.i./acre) | | 27.1 |
| Untreated | | 30.3 |

The data show that Formulation 1.3 was better than all of the standard formulations, including Prevathon® at the highest rate (same chlorantraniliprole rate as in the premix), indicating superiority of the premix formulation over the tank mix.

The data further show that Formulation 1.3 is superior to Besiege®, indicating superiority of bifenthrin as pyrethroid ion in the mix.

Example 2G

Example 1 Formulation 1.3 was evaluated as a foliar application for control of fall armyworm in sweet corn, and for determination of crop safety. The field trial was conducted on sweet corn in Quitman, GA (USA). The trial was set up as a randomized complete block experimental design utilizing 4 replications. Plots were 30 ft long by 12 ft wide. One application was made on Jun. 5, 2019, using a spray volume of 20 gallons per acre. Plant damage by fall armyworm was evaluated as a % damage per plot on Jun. 12, 19 and 26, 2019. The pooled mean % plant damage across the three evaluation dates is presented in the Table 2I where "Plant Damage (%)" refers to the mean pooled percent plant damage by fall armyworm in 30 foot rows.

TABLE 2I

| Treatment/Rate | Type | Plant Damage (%) |
|---|---|---|
| Formulation 1.3 (0.097 lb a.i./acre) | Premix | 15.1 |
| Formulation 1.3 (0.117 lb a.i./acre) | Premix | 8 |
| Formulation 1.3 (0.167 lb a.i./acre) | Premix | 4.8 |
| Formulation 1.3 (0.117 lb a.i./acre) + Dyne-Amic ® (0.25%) | Tank mix | 4.6 |
| Brigade ® (0.1 lb a.i./acre) + Prevathon ® (0.067 lb a.i./acre) | Tank mix | 15.2 |
| Prevathon ® (0.067 lb a.i./acre) | | 12.5 |
| Besiege ® (0.104 lb a.i./acre) | | 8.5 |
| Hero ® (0.1 lb a.i./acre) | | 17.8 |
| Untreated | | 28.2 |

The data show that Formulation 1.3 was better than all of the standard formulations, including Prevathon® at the highest rate (same chlorantraniliprole rate as in the premix), indicating superiority of the premix formulation over the tank mix.

The data further show that Formulation 1.3 is superior to Besiege®, indicating superiority of bifenthrin as pyrethroid ion in the mix.

Example 2H

Example 1 Formulation 1.3 was evaluated as a foliar application for control of bollworm and other key Lepidoptera pests in cotton. The field trial was conducted on sweet corn in Alexandria, LA (USA). The trial was set up as a randomized complete block experimental design utilizing 4 replications. Plots were 50 ft long by 12.67 ft wide. One application was made on Jul. 20, 2019, using a spray volume of 10 gallons per acre. Evaluations were made on 25 terminals, squares, flowers and bolls (fruit) per plot at various dates after treatment to determine damage by bollworm. The pool mean damage across dates for each evaluation type are presented in the Table 2J where "Flowers" refers to mean pooled (%) damaged flowers, "Fruit" refers to mean pooled (%) damaged fruit, "Squares" refers to mean pooled (%) damaged square, and "Terminal" refers to mean pooled (%) damaged terminal.

TABLE 2J

| Treatment/Rate | Type | Flowers | Fruit | Squares | Terminal |
|---|---|---|---|---|---|
| Formulation 1.3 (0.097 lb a.i./acre) | Premix | 1 | 1.33 | 2.33 | 2.33 |
| Formulation 1.3 (0.117 lb a.i./acre) | Premix | 0.33 | 1 | 3.33 | 4 |
| Formulation 1.3 (0.167 lb a.i./acre) | Premix | 1 | 1.33 | 1.33 | 1.67 |
| Formulation 1.3 (0.117 lb a.i./acre) + Dyne-Amic ® (0.25% v/v) | | 1 | 0.67 | 2.67 | 2 |
| Brigade ® (0.1 lb a.i./acre) + Prevathon ® (0.067 lb a.i./acre) | Tank mix | 1 | 1.67 | .67 | 1.33 |
| Prevathon ® (0.067 lb a.i./acre) | | | 3.67 | 2 | 2.67 | 3.33 |
| Besiege ® (0.075 lb a.i./acre) | | 2 | 2 | 3 | 2.33 |
| Besiege ® (0.104 lb a.i./acre) | | 2 | 2 | 4 | 2 |
| Untreated | | 2.67 | 3 | 7.33 | 5.67 |

The data show that Formulation 1.3 was better than all of the standard formulations, including Prevathon® at the highest rate (same chlorantraniliprole rate as in the premix), but similar to the tank mix of bifenthrin and chlorantraniliprole at the same rates.

The data further show that Formulation 1.3 is superior to Besiege®, indicating superiority of bifenthrin as pyrethroid ion in the mix.

Example 3

The SC formulations in Table 3A were prepared in an agitated vessel or tank according to the method of Example 1. Some of the compositions at a concentration of 342 ppm was evaluated for suspendability at 54° C. at times 0 and 2 weeks by CIPAC method MT 161. In Table 3, the contents are reported in wt. % and ratio refers to the weight ratio of bifenthrin to chlorantraniliprole on an active ingredient basis.

TABLE 3A

| | Form. 3.1 | Form. 3.2 | Form. 3.3 | Form. 3.4 |
|---|---|---|---|---|
| Component | | | | |
| Bifenthrin technical | 18.3% | 18.4% | 20.4% | 20.4% |
| Chlorantraniliprole Technical | 6.1% | 6.1% | 5.1% | 4.1% |
| Ratio | 3:1 | 3:1 | 4:1 | 5:1 |
| Dextrol ™ OC-180 | 2.0% | 2.0% | 2.0% | 2.0% |
| Atlox ® 4913 | 3.0% | 3.0% | 3.0% | 3.0% |
| Agnique ® PG9116 | 6.0% | 6.1% | 6.0% | 6.0% |
| Synergen W06 | — | — | — | — |
| Xiameter ® AFE-0100 | 0.1% | 0.1% | 0.2% | 0.2% |
| Kelzan ® S Plus | 8.0% | 6.9% | 8.0% | 8.0% |
| Acticide ® LA 1209 | — | — | 0.1% | 0.1% |
| Proxel ® GXL | 0.1% | — | — | — |
| Kathon ™ CG/ICP | — | 0.1% | — | — |
| Glycerin | 5.0% | 5.0% | 5.0% | 5.0% |
| Ammonium sulfate | 3.0% | 3.1% | 3.0% | 3.0% |
| Water | 48.4% | 49.2% | 47.2% | 48.2% |
| Suspensibility (342 ppm) | | | | |
| Initial | 94% | 95% | 99% | 99% |
| 2 weeks at 54° C. | 98% | 96% | 99% | 99% |

A second set of formulations were prepared and are reported in Table 3B where "type" refers to oil dispersion (OD), suspoemulsion (SE), and suspension concentrate (SC).

| Component | Form. 3.5 | Form. 3.6 | Form. 3.7 | Form. 3.8 | Form. 3.9 |
|---|---|---|---|---|---|
| Bifenthrin technical | 28.0% | 28.0% | 28.0% | 28.0% | 28.0% |
| Chlorantraniliprole Technical | 7.0% | 7.0% | 7.0% | 7.0% | 7.0% |
| Type | OD | OD | SE | SE | SC |
| Ratio | 4:1 | 4:1 | 4:1 | 4:1 | 4:1 |
| Bentone ® SD02 | 0.5% | 0.5% | — | — | — |
| Morwet ® D400 | 1.5% | 1.5% | — | — | — |
| Ultraric ® 5000 | 1.5% | 1.5% | 1% | 1% | 2.5% |
| Surfom ® R400 | 1.5% | 1.5% | 1% | 1% | — |
| Ninate ® 60E | 2.5% | 2.5% | — | — | — |
| Solvesso ® 200 ND | 30.0% | 12.9% | 11% | 30.0% | — |
| Surfom ® EMS 2000 | 27.5% | 24.6% | — | — | — |
| Disflamoll ® TOF | — | 20.0% | 19.0% | — | — |
| Silfoam ® SRE | — | — | 0.15% | 0.15% | 0.8% |
| Acticide ® SPX | — | — | 0.1% | 0.1% | 0.1% |
| Propylene glycol | — | — | 4.0% | 4.0% | 6.0% |
| Veegum ® R | — | — | 0.4% | 0.4% | — |
| Polyfon ® H | — | — | 0.8% | 0.8% | 1.0% |
| Atlox ® 4915 | — | — | 1.5% | 1.5% | — |
| Atlox ® 4913 | — | — | — | — | 1.5% |
| Goma Xantana | — | — | 0.12% | 0.12% | 0.12% |
| Water | — | — | 24.43% | 24.43% | 52.98% |

Example 4

Formulations 3.5 to 3.9 of Example 3 were evaluated on the pests *E. heros* (nymphs and adults), *D. melacanthus* (nymphs and adults), and *C. includens* $3^{rd}$ instar. In each evaluation, four plants (soybean and maize at BBCH 10 stage) were treated with 10 stink bugs per plant/40 insects per treatment. 32 $3^{rd}$ instar larvae were tested in each treatment in soybean plants. Three premix application rates of formulations 3.5 to 3.9 were done: T1 where the compositions were applied at a total rate of 37.5 g a.i./ha (7.5 g/ha chlorantraniliprole and 30 g/ha bifenthrin); T2 where the compositions were applied at a total rate of 62.5 g a.i./ha (12.5 g/ha chlorantraniliprole and 50 g/ha bifenthrin); and T3 where the compositions were applied at a total rate of 87.5 g a.i./ha (17.5 g/ha chlorantraniliprole and 70 g/ha bifenthrin). The compositions were foliar applied by spraying at a rate of 200 L/ha. Comparative treatments were done with tank mixes containing chlorantraniliprole (Premio® SC) and bifenthrin (Talstar®) at application rates corresponding to the application rates of formulations 3.5 to 3.9, namely: 7.5 g a.i./ha and 30 g a.i./ha; 12.5 g a.i./ha and 50 g a.i./ha; and 17.5 g a.i./ha and 70 g a.i./ha.

Example 4A

In Example 4A, the mortality of *C. includens* ($3^{rd}$ instar larvae) after 96 hours is reported in Table 4A below in mean mortality (%) and where "tank mix" refers to the tank mix combinations of Premio® and Talstar® and "UTC" refers to untreated control.

TABLE 4A

| Formulation | 17.5 g/ha + 70 g/ha | 12.5 g/ha + 50 g/ha | 7.5 g/ha + 30 g/ha |
|---|---|---|---|
| 3.5 | 100% | 93.8% | 71.9% |
| 3.6 | 100% | 100% | 84.4% |
| 3.7 | 100% | 100% | 96.9% |
| 3.8 | 96.9% | 93.8% | 93.8% |
| 3.9 | 96.9% | 90.6% | 78.1% |
| Tank mix | 100% | 100% | 90.6% |
| UTC | 0% | 0% | 0% |

Example 4B

In Example 4B, the mortality of *E. heros* (3' instar larvae) after 72 hours is reported in Table 4B below.

TABLE 4B

| Formulation | 17.5 g/ha + 70 g/ha | 12.5 g/ha + 50 g/ha | 7.5 g/ha + 30 g/ha |
|---|---|---|---|
| 3.5 | 97.5% | 82.5% | 50% |
| 3.6 | 100% | 100% | 96% |
| 3.7 | 100% | 100% | 87.5% |
| 3.8 | 100% | 100% | 80% |
| 3.9 | 100% | 100% | 82.5% |
| Tank mix | 100% | 100% | 92.5% |
| UTC | 0% | 0% | 0% |

Example 4C

In Example 4C, the mortality of *E. heros* ($3^{111}$ instar larvae) after 72 hours, with 40 mm simulated rainfall, is reported in Table 4C below.

TABLE 4C

| Formulation | 17.5 g/ha + 70 g/ha | 12.5 g/ha + 50 g/ha | 7.5 g/ha + 30 g/ha |
|---|---|---|---|
| 3.5 | 77.5% | 37.5% | 22.5% |
| 3.6 | 90% | 50% | 42.5% |
| 3.7 | 65% | 55% | 37.5% |
| 3.8 | 87.5% | 82.5% | 67.5% |
| 3.9 | 92.5% | 87.5% | 86% |
| Tank mix | 100% | 97.5% | 60% |
| UTC | 0% | 0% | 0% |

Example 4D

In Example 4D, the mortality of *E. heros* (adults) after 72 hours is reported in Table 4D below.

TABLE 4D

| Formulation | 17.5 g/ha + 70 g/ha | 12.5 g/ha + 50 g/ha | 7.5 g/ha + 30 g/ha |
|---|---|---|---|
| 3.5 | 100% | 97.5% | 82.5% |
| 3.6 | 100% | 97.5% | 92.5% |
| 3.7 | 100% | 97.5% | 90% |
| 3.8 | 100% | 96% | 87.5% |
| 3.9 | 100% | 97.5% | 87.5% |
| Tank mix | 100% | 100% | 90% |
| UTC | 0% | 0% | 0% |

Example 4E

In Example 4E, the mortality of *D. melacanthus* (adults) after 72 hours is reported in Table 4E below.

TABLE 4E

| Formulation | 17.5 g/ha + 70 g/ha | 12.5 g/ha + 50 g/ha | 7.5 g/ha + 30 g/ha |
|---|---|---|---|
| 3.5 | 57.5% | 60% | 32.5% |
| 3.6 | 80% | 60% | 25% |
| 3.7 | 82.5% | 46% | 37.5% |
| 3.8 | 76% | 70% | 72.5% |
| 3.9 | 100% | 87.5% | 86% |
| Tank mix | 100% | 92.5% | 87.5% |
| UTC | 0% | 0% | 0% |

Example 4F

In Example 4F, the mortality of *D. melacanthus* ($3^{rd}$ instar nymphs) after 72 hours is reported in Table 4F below.

TABLE 4F

| Formulation | 17.5 g/ha + 70 g/ha | 12.5 g/ha + 50 g/ha | 7.5 g/ha + 30 g/ha |
|---|---|---|---|
| 3.5 | 100% | 100% | 96% |
| 3.6 | 100% | 92.5% | 96% |
| 3.7 | 100% | 100% | 87.5% |
| 3.8 | 100% | 100% | 60% |
| 3.9 | 100% | 97.5% | 97.5% |
| Tank mix | 100% | 97.5% | 96% |
| UTC | 0% | 0% | 0% |

Example 5

Ratios of bifenthrin to chlorantraniliprole were evaluated on various crops and target pests as indicated in the protocol disclosed Table 5A below where "Lab." Refers to laboratory, "No. of Treat." refers to number of treatments, and Total refers to the total number of insects tested. In each evaluation, foliar application was done, the insecticide action was contact/ingestion and 32 insects were evaluated in each treatment.

TABLE 5A

Treatment protocols

| Protocol | Crop | Target Pest | Instar | Strain | No. of Treat. | Total |
|---|---|---|---|---|---|---|
| A | Soybean | C. includens | $3^{rd}$ | Lab. | 10 | 320 |
| B | Soybean | H. armigera | $3^{rd}$ | Lab. | 13 | 416 |
| C | Soybean | E. Heros | $3^{rd}$-Nymph | Lab. | 10 | 320 |
| D | Soybean | E. Heros | Adults | Lab. | 10 | 320 |
| E | Corn | D. melachantus | $3^{rd}$-Nymph | Lab. | 10 | 320 |
| F | Corn | D. melachantus | Adults | Lab. | 10 | 320 |
| G | Corn | S. frugiperda | $3^{rd}$ | Lab. | 13 | 416 |
| H | Corn | S. frugiperda | $3^{rd}$ | Field | 13 | 416 |

The treatment schedule shown in Table 5B was used where "dose" refers to application rate, "ratio" refers to the ratio of bifenthrin to chlorantraniliprole on an a.i. basis.

TABLE 5B

| Treat No. | Treatment | Dose g a.i./ha | Ratio |
|---|---|---|---|
| 5.1 | UTC | 0 | — |
| 5.2 | Chlorantraniliprole | 5 | — |
| 5.3 | Chlorantraniliprole | 7.5 | — |
| 5.4 | Bifenthrin | 10 | — |
| 5.5 | Bifenthrin | 15 | — |
| 5.6 | Bifenthrin | 30 | — |
| 5.7 | Bifenthrin | 45 | — |
| 5.8 | Bifenthrin | 60 | — |
| 5.9 | Chlorantraniliprole + Bifenthrin | 5 + 10 | 2:1 |
| 5.10 | Chlorantraniliprole + Bifenthrin | 7.5 + 15 | 2:1 |
| 5.11 | Chlorantraniliprole + Bifenthrin | 7.5 +30 | 4:1 |
| 5.12 | Chlorantraniliprole + Bifenthrin | 7.5 + 45 | 6:1 |
| 5.13 | Chlorantraniliprole + Bifenthrin | 7.5 + 68 | 8:1 |

Treatments were applied inside a sprayer chamber simulating a volume of 200 l/ha over soybean plants. After a drying period, treated leaves were removed from the plants and placed inside 16 well trays containing agar solution (2%) covered with filter paper. Two 16 well trays were prepared for each treatment (32 larvae/treatment). One 3' instar larva from laboratory strains was placed in each well over the treated leaf. Trays were kept under controlled conditions of 25° C., photoperiod of 14:10 hours, and 60% RH. Morality was evaluated after 96 hours. Mortality is defined as dead and moribund larvae.

Synergy or antagonism was determined using the Colby Equation where:

$$E=X+(100-X)(Y)/100)=X+Y-X*Y/100.$$

X is the observed result for compound A at p grams a.e./ha. Y is the observed result for compound B at q grams a.e./ha. E is the expected result for a mixture of A and B at (p+q) g a.i./ha if there is no synergy or antagonism. If the observed value for the combination of A and B is greater than E (Obs>E) then synergy is indicated. If the observed value for the combination of A and B is less than E (Obs<E) then antagonism is indicated.

Example 5A

Morality on C. includens was evaluated according to protocol A (refer to Table 5B) using treatment numbers 5.1, 5.3, 5.5 to 5.8 and 5.10 to 5.13 (refer to Table 5B). The results are reported in Table 5C below where mortality is the mean mortality, the E value was calculated by the Colby equation, and the synergy value is determined by dividing the mean mortality (%) by the expected value (E).

TABLE 5C

| Treatment | Mortality | E Value | Synergy Factor | Comment |
|---|---|---|---|---|
| 5.1 (UTC) | 0% | — | — | — |
| 5.3 | 100% | — | — | — |
| 5.5 | 34.4% | — | — | — |
| 5.6 | 68.8% | — | — | — |
| 5.7 | 78.1% | — | — | — |
| 5.8 | 78.1% | — | — | — |
| 5.10 | 75% | 100 | 0.8 | Antagonism |
| 5.11 | 93.8% | 100 | 0.9 | Antagonism |
| 5.12 | 96.9% | 100 | 1.0 | Additive |
| 5.13 | 96.9% | 100 | 1.0 | Additive |

Chlorantraniliprole at 7.5 g a.i./ha was the most effective for control of C. includens.

The most efficacious combinations to control $3^{rd}$ instar larvae were chlorantraniliprole+bifenthrin at 7.5 g a.i./ha+30 g 7.5 g+45 g a.i./ha, and 7.5 g+60 g a.i./ha, Antagonism was indicated for ratios of 2:1 and 4:1, and an additive effect was indicated for ratios of 6:1 and 8:1.

Example 5B

Morality on H. armigera was evaluated according to protocol B (refer to Table 5B) using treatment numbers 5.1 to 5.13 (refer to Table 5B). The results are reported in Table 5D.

TABLE 5D

| Treatment | Mortality | E Value | Synergy Factor | Comment |
|---|---|---|---|---|
| 5.1 (UTC) | 0% | — | — | — |
| 5.2 | 84.4% | — | — | — |
| 5.3 | 100% | — | — | — |
| 5.4 | 0% | — | — | — |
| 5.5 | 0% | — | — | — |
| 5.6 | 0% | — | — | — |
| 5.7 | 0% | — | — | — |
| 5.8 | 9.4% | — | — | — |
| 5.9 | 96.9% | 84 | 1.15 | Synergistic |
| 5.10 | 100% | 100 | 1.0 | Additive |
| 5.11 | 100% | 100 | 1.0 | Additive |
| 5.12 | 100% | 100 | 1.0 | Additive |
| 5.13 | 100% | 100 | 1.0 | Additive |

Chlorantraniliprole at 7.5 g a.i./ha was the most effective for H. armigera control.

Because of H. armigera resistance to pyrethroids, bifenthrin presented lower control, even at a higher dose of 60 g a.i./ha.

Synergism was indicated for a ratio of 2:1 using lower doses of chlorantraniliprole and bifenthrin (5 and 10 g a.i./ha, respectively). All of the other combinations were effective.

Example 5C

Morality on S. frugiperda was evaluated according to protocols G and H (refer to Table 5B), but where two S.

frugiperda strains were tested: a laboratory strain (susceptible) and a field strain in F3 generation sampled in the 2018/2019 season in Sinop-MT region using treatment numbers 5.1 to 5.10 (refer to Table 5B). The results are reported in Tables 5E (Laboratory Strain) and 5F (Filed Strain).

TABLE 5E (Laboratory Strain)

| Treatment | Mortality | E Value | Synergy Factor | Comment |
|---|---|---|---|---|
| 5.1 (UTC) | 3.1% | — | — | — |
| 5.2 | 96.9% | — | — | — |
| 5.3 | 100% | — | — | — |
| 5.4 | 34.4% | — | — | — |
| 5.5 | 53.1% | — | — | — |
| 5.6 | 78.1% | — | — | — |
| 5.7 | 96.9% | — | — | — |
| 5.8 | 93.8% | — | — | — |
| 5.9 | 87.5% | 98 | 0.9 | Antagonistic |
| 5.10 | 90.6% | 100 | 0.9 | Antagonistic |
| 5.11 | 96.9% | 100 | 1.0 | Additive |
| 5.12 | 100% | 100 | 1.0 | Additive |
| 5.13 | 100% | 100 | 1.0 | Additive |

TABLE 5F

| Treatment | Mortality | E Value | Synergy Factor | Comment |
|---|---|---|---|---|
| 5.1 (UTC) | 6.3% | — | — | — |
| 5.2 | 40.6% | — | — | — |
| 5.3 | 59.4% | — | — | — |
| 5.4 | 3.1% | — | — | — |
| 5.5 | 3.1% | — | — | — |
| 5.6 | 15.6% | — | — | — |
| 5.7 | 43.8% | — | — | — |
| 5.8 | 43.8% | — | — | — |
| 5.9 | 40.6% | 42 | 1.0 | Additive |
| 5.10 | 50.0% | 61 | 0.8 | Antagonistic |
| 5.11 | 75% | 66 | 1.1 | Synergistic |
| 5.12 | 78.1% | 77 | 1.0 | Additive |
| 5.13 | 68.8% | 77 | 0.9 | Antagonistic |

Chlorantraniliprole+bifenthrin (7.5 g a.i./ha and 45 g a.i./ha, respectively) was the most effective treatment on *S. frugiperda*.

Lower doses of bifenthrin presented lower control, especially on the field strain.

An additive and a synergistic effect were indicated for a ratio of 4:1 for the lab and field strains, respectively.

Example 5D

Morality on *E. heros* was evaluated according to protocols C and D (refer to Table 5B). In the evaluation method, insecticides (treatment numbers 5.1, 5.3, 5.5 to 5.8 and 5.10 to 5.13 (refer to Table 5B)) were applied over soybean plants at V2 stage inside a spray chamber. After a drying period, a first portion of the plants were infested with 10 $3^{rd}$ instar nymphs of *E. heros* per plant, with three repetitions per treatment with a total of 30 nymphs per treatment. After the drying period, a second portion of the plants were infested with 10 adults of *E. heros* per plant, with three repetitions per treatment with a total of 30 adults per treatment. Infested plants were maintained in a greenhouse controlled at a temperature of 26° C. Mortality was evaluated after 72 hours. The results are reported in Tables 5G (nymphs) and 5H (adults).

TABLE 5G (nymphs)

| Treatment | Mortality | E Value | Synergy Factor | Comment |
|---|---|---|---|---|
| 5.1 (UTC) | 0% | — | — | — |
| 5.3 | 0% | — | — | — |
| 5.5 | 38.9% | — | — | — |
| 5.6 | 43.3% | — | — | — |
| 5.7 | 76.7% | — | — | — |
| 5.8 | 85.2% | — | — | — |
| 5.10 | 35.0% | 38.9 | 0.9 | Antagonism |
| 5.11 | 75.9% | 43.3 | 1.8 | Synergism |
| 5.12 | 78.9% | 76.7 | 1.0 | Additive |
| 5.13 | 86.7% | 85.2 | 1.0 | Additive |

TABLE 5H (adults)

| Treatment | Mortality | E Value | Synergy Factor | Comment |
|---|---|---|---|---|
| 5.1 (UTC) | 3.3% | — | — | — |
| 5.3 | 3.3% | — | — | — |
| 5.5 | 3.3% | — | — | — |
| 5.6 | 30.0% | — | — | — |
| 5.7 | 56.7% | — | — | — |
| 5.8 | 80.0% | — | — | — |
| 5.10 | 10.0% | 6.6 | 1.5 | Synergism |
| 5.11 | 36.7% | 32.6 | 1.1 | Synergism |
| 5.12 | 58.1% | 58.1 | 1.0 | Additive |
| 5.13 | 83.3% | 80.7 | 1.0 | Additive |

Chlorantraniliprole did not control *E. heros*.

The most effective combination for *E. heros* control was bifenthrin and chlorantraniliprole at application rates of 60 g a.i./ha and 7.5 g a.i./ha, respectively.

For nymphs, a synergistic effect was indicated at a bifenthrin to chlorantraniliprole ratio of 4:1. For adults, a synergistic effect was observed at ratios of 2:1 and 4:1.

Example 5E

Morality on *D. melachantus* was evaluated according to protocols E and F (refer to Table 5B). In the evaluation method, insecticides (treatment numbers 5.1, 5.3, 5.5 to 5.8 and 5.10 to 5.13 (refer to Table 5B)). Evaluation was done according to the method of Example 5D. The results are reported in Tables SI (nymphs) and 5J (adults).

TABLE 5I (nymphs)

| Treatment | Mortality | E Value | Synergy Factor | Comment |
|---|---|---|---|---|
| 5.1 (UTC) | 3.3% | — | — | — |
| 5.3 | 7.0% | — | — | — |
| 5.5 | 56.7% | — | — | — |
| 5.6 | 70.0% | — | — | — |
| 5.7 | 100% | — | — | — |
| 5.8 | 100% | — | — | — |
| 5.10 | 59.3% | 59.7 | 1.0 | Additive |
| 5.11 | 82.5% | 72.1 | 1.1 | Synergism |
| 5.12 | 96.7% | 100 | 1.0 | Additive |
| 5.13 | 96.7% | 100 | 1.0 | Additive |

TABLE 5J

| | (adults) | | | |
|---|---|---|---|---|
| Treatment | Mortality | E Value | Synergy Factor | Comment |
| 5.1 (UTC) | 3.3% | — | — | — |
| 5.3 | 0% | — | — | — |
| 5.5 | 39.3% | — | — | — |
| 5.6 | 70.0% | — | — | — |
| 5.7 | 100% | — | — | — |
| 5.8 | 100% | — | — | — |
| 5.10 | 64.8% | 39.3 | 1.7 | Synergism |
| 5.11 | 96.7% | 70 | 1.1 | Synergism |
| 5.12 | 100% | 100 | 1.0 | Additive |
| 5.13 | 100% | 100 | 1.0 | Additive |

Chlorantraniliprole did not control *D. melacanthus*.

The most effective combination for *D. melacanthus* control was bifenthrin and chlorantraniliprole at application rates of 60 g a.i./ha and 7.5 g a.i./ha, respectively and 45 g a.i./ha and 7.5 g a.i./ha, respectively.

For nymphs, a synergistic effect was indicated at a bifenthrin to chlorantraniliprole ratio of 4:1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insecticidal composition wherein the composition is a concentrate comprising:
   (i) from about 11 wt. % to about 20 wt. % bifenthrin, and
   (ii) from about 5 wt. % to about 15 wt. % chlorantraniliprole; wherein the weight ratio of bifenthrin to chlorantraniliprole on an active ingredient basis is from about 1.5:1 to about 5:1;and wherein the composition further comprises
   (iii) from about 1 wt. % to about 10 wt. % of a dispersant component comprising at least one dispersant compound,
   (iv) from about 1 wt. % to about 10 wt. % of a wetting agent component comprising at least one wetting agent compound,
   (v) from about 0.1 wt. % to about 12 wt. % of a rheology modifier component comprising at least one rheology modifier compound, and
   (vi) from about 20 wt. % to about 60 wt. % water, and wherein the wt. % of each component is based on the total weight percentage of the composition; wherein the composition is formulated to be effective at controlling insect pests in legume crop or stink bugs and bollworms in crop.

2. A tank mix or premix composition comprising the insecticidal composition of claim 1 and a diluent, wherein each of the bifenthrin and the chlorantraniliprole concentration is present in less than 5 wt. %, from about 0.005 wt. % to about 4 wt. %, from about 0.01 wt. % to about 1 wt. %, from about 0.01 wt. % to about 0.1 wt. %, or from about 0.01 wt. % to about 0.05 wt. %, and wherein the wt. % of each component is based on the total weight percentage of the composition.

3. The tank mix or premix composition of claim 2 wherein the diluent comprises water.

4. The tank mix or premix composition of claim 2 further comprising at least one adjuvant compound.

5. The insecticidal tank mix or premix composition of claim 2 wherein the diluent comprises an aromatic hydrocarbon solvent.

6. The insecticidal composition of any one of claims 1-5 further comprising a phosphate ester of Formula I wherein $$R^1\diagdown_{O}\diagup P \diagup^{O-R^2}_{O-R^3} \qquad \text{I}$$

$R^1$ is a straight-chain or branched alkyl having from 4 to 12 carbon atoms, or a phenyl group optionally substituted with from 1 to 3 $C_1$-$C_4$ straight-chain or branched alkyl groups, and $R^2$ and $R^3$ are each independently a straight-chain or branched alkyl having from 2 to 8 carbon atoms, or a phenyl group optionally substituted with from 1 to 3 $C_1$-$C_4$ straight-chain or branched alkyl groups.

7. The composition of claim 6, wherein the phosphate ester is selected from tris-(2-ethylhexyl) phosphate, tri-n-octyl phosphate, and tri-iso-butyl phosphate.

8. The composition of claim 7, wherein the phosphate ester is tris-(2-ethylhexyl) phosphate.

9. The insecticidal composition of claim 1, comprising:
   (i) from about 12 wt. % to about 18 wt. % bifenthrin, and
   (ii) from about 5 wt. % to about 12 wt. % chlorantraniliprole;
   (iii) from about 3 wt. % to about 7 wt. % of the dispersant component;
   (iv) from about 4 wt. % to about 9 wt. % of the wetting agent component;
   (v) from about 0.12 wt. % to about 10 wt. % of the rheology modifier component; and
   (vi) from about 30 wt. % to about 60 wt. % of water; wherein the weight ratio of bifenthrin to chlorantraniliprole on an active ingredient basis is from about 1.5:1 to about 5:1;
   wherein the composition is formulated to be effective at controlling insect pests in legume crop or stink bugs and bollworms in crop.

10. The tank mix or premix composition of claim 4 wherein the at least one adjuvant is selected from at least one surfactant compound, at least one crop oil compound, and a combination thereof.

11. The insecticidal composition of claim 1 wherein the weight ratio of bifenthrin to chlorantraniliprole on an active ingredient basis is between about 3:1 and about 5:1.

12. A method for controlling insect pests on plants, the method comprising applying the composition of any one of claims 1-5 to a plurality of the plants.

13. The method of claim 12 wherein the composition further comprises phosphate ester of Formula I wherein $$R^1\diagdown_{O}\diagup P \diagup^{O-R^2}_{O-R^3} \qquad \text{I}$$

$R^1$ is a straight-chain or branched alkyl having from 4 to 12 carbon atoms, or a phenyl group optionally substituted with from 1 to 3 $C_1$-$C_4$ straight-chain or branched alkyl groups, and $R^2$ and $R^3$ are each independently a straight-chain or branched alkyl having from 2 to 8 carbon atoms, or a phenyl group optionally substituted with from 1 to 3 $C_1$-$C_4$ straight-chain or branched alkyl groups.

14. The method of claim 13, wherein the phosphate ester is selected from tris-(2-ethylhexyl) phosphate, tri-n-octyl phosphate, and tri-iso-butyl phosphate.

15. The method of claim 13, wherein the phosphate ester is tris-(2-ethylhexyl) phosphate.

* * * * *